United States Patent
Hori et al.

(10) Patent No.: US 9,821,838 B2
(45) Date of Patent: Nov. 21, 2017

(54) STEERING CONTROLLER

(71) Applicant: DENSO CORPORATION, Kariya, Aichi-pref. (JP)

(72) Inventors: Masashi Hori, Anjo (JP); Yasuhiko Mukai, Anjo (JP)

(73) Assignee: DENSO CORPORATION, Kariya (JP)

( * ) Notice: Subject to any disclaimer, the term of this patent is extended or adjusted under 35 U.S.C. 154(b) by 194 days.

(21) Appl. No.: 14/300,660

(22) Filed: Jun. 10, 2014

(65) Prior Publication Data
US 2014/0360803 A1 Dec. 11, 2014

(30) Foreign Application Priority Data

Jun. 11, 2013 (JP) .................................. 2013-123134

(51) Int. Cl.
| | |
|---|---|
| B62D 5/04 | (2006.01) |
| G01L 5/22 | (2006.01) |
| G01L 25/00 | (2006.01) |
| B62D 6/10 | (2006.01) |

(52) U.S. Cl.
CPC ............ B62D 5/049 (2013.01); B62D 5/0484 (2013.01); B62D 6/10 (2013.01); G01L 5/221 (2013.01); G01L 25/003 (2013.01)

(58) Field of Classification Search
CPC ......... G01L 5/221; G01L 25/003; B62D 6/10; B62D 5/049
See application file for complete search history.

(56) References Cited

U.S. PATENT DOCUMENTS

2002/0189371 A1 12/2002 Nakane et al.
2003/0155627 A1 8/2003 Fukaya et al.
(Continued)

FOREIGN PATENT DOCUMENTS

JP 06-206478 7/1994
JP 2004-224077 8/2004
(Continued)

OTHER PUBLICATIONS

Machine Translation of JP-2012-228922, retrieved from Espacenet.com on Nov. 15, 2015.*
(Continued)

*Primary Examiner* — Thomas Ingram
(74) *Attorney, Agent, or Firm* — Nixon & Vanderhye P.C.

(57) ABSTRACT

A control section of a steering controller calculates a steer angle which is a turning angle of a first column shaft based on a first detection value detected by a steer angle sensor, and calculates a second shaft turning angle which is a turning angle of a second column shaft based on a second detection value detected by a second shaft rotation angle sensor. A steering torque detection value is calculated based on a third detection value detected by a torque sensor. An abnormality determination part determines abnormalities of the steering torque detection value based on the steer angle and the second shaft turning angle. Thereby, abnormalities of the steering torque detection value are detected without multiplexing the steering torque detection value. Further, if the steering torque detection value is multiplexed, an abnormal steering torque detection value can be specifically identified.

12 Claims, 15 Drawing Sheets

(56) References Cited

U.S. PATENT DOCUMENTS

| | | | | |
|---|---|---|---|---|
| 2004/0056748 A1* | 3/2004 | Masaki | ............... | B62D 6/10 336/119 |
| 2004/0238258 A1* | 12/2004 | Ono | ............... | B62D 1/163 180/402 |
| 2005/0171667 A1* | 8/2005 | Morita | ............... | B62D 5/049 701/43 |
| 2007/0246290 A1* | 10/2007 | Deshmukh | ............... | B62D 6/10 180/446 |
| 2010/0145579 A1* | 6/2010 | O'Brien | ............... | B62D 5/0457 701/42 |
| 2010/0299027 A1* | 11/2010 | Aoki | ............... | B62D 5/0463 701/42 |
| 2012/0006612 A1* | 1/2012 | Wilson-Jones | ............... | B62D 5/0469 180/446 |
| 2012/0173081 A1* | 7/2012 | Hsu | ............... | B62D 5/0457 701/42 |
| 2013/0166142 A1* | 6/2013 | Jang | ............... | B62D 15/0245 701/34.4 |
| 2015/0046036 A1* | 2/2015 | Sasaki | ............... | G01L 5/221 701/41 |

FOREIGN PATENT DOCUMENTS

| | | |
|---|---|---|
| JP | 2009-012511 | 1/2009 |
| JP | 2012-228922 | 11/2012 |

OTHER PUBLICATIONS

Machine Translation of JP H06-206478, retrieved from Espacenet.com on Nov. 15, 2015.*

Machine Translation of JP 2004-224077, retrieved from Espacenet.com on Nov. 15, 2015.*

Office Action (2 pages) dated Jul. 9, 2015, issued in corresponding Japanese Application No. 2013-123134 and English translation (3 pages).

* cited by examiner

STEERING CONTROLLER

CROSS REFERENCE TO RELATED APPLICATION

The present application is based on and claims the benefit of priority of Japanese Patent Application No. 2013-123134, filed on Jun. 11, 2013, the disclosure of which is incorporated herein by reference.

TECHNICAL FIELD

The present disclosure relates to a steering controller that determines an abnormal steering torque detection value.

BACKGROUND INFORMATION

An electric power steering device provides a supplemental torque based on an inputted steering torque, for the purpose of reducing a driver's steering load. A torque sensor is used to detect the steering torque. For example, in a patent document 1 (i.e., Japanese Patent Laid-Open No. 2003-149062), a variation in torque detection is reduced by providing plural magnetic sensors.

If a problem occurs with the torque sensor, it is desirable to troubleshoot the torque sensor so that an unintended output of the supplemental torque from the electric power steering device that is not intended by the driver is prevented. For example, by configuring the torque sensor to output and compare two output values, the problem with the torque sensor may be detected in some cases. However, when having two output values, determining which one of two values is the correct value may be difficult. Further, when having three or more output values, a majority determination may be performed for determining which one of the three output values is a troubled output. However, such a troubleshooting means increases the number of parts in the device.

SUMMARY

It is an object of the present disclosure to provide a steering controller that determines abnormal steering torque detection values.

In an aspect of the present disclosure, the steering controller includes: a first shaft, a second shaft, a first detector, a second detector, a torque detector, a power-steering device, and a control section.

The first shaft is connected to a steering member. The steering member receives a steering torque which is inputted to the steering member by a driver. The second shaft serves, in connection with the first shaft, as a transmission path for transmitting the inputted steering torque to a steerable wheel.

The first detector detects a turning angle of the first shaft. The turning angle of the first shaft is defined as a first detection value.

The second detector detects a turning angle of the second shaft. The turning angle of the second shaft is defined as a second detection value.

A torque detector is provided at a position between the first shaft and the second shaft, and detects a steering torque. The steering torque is defined as a third detection value.

The power-steering device is provided on a side of the torque detector that is closer to the steerable wheel than the steering member, and has an electric motor which outputs the supplemental torque for assisting the steering of the steering member by the driver.

A control section has a first rotation angle calculator, a second rotation angle calculator, a steering torque calculator, a drive controller, and an abnormality determiner.

The first rotation angle calculator calculates a first turning angle that is a turning angle of the first shaft based on the first detection value.

The second rotation angle calculator calculates a second turning angle that is a turning angle of the second shaft based on the second detection value.

The steering torque calculator calculates a steering torque detection value based on the third detection value.

The drive controller controls a drive of the electric motor based on the steering torque detection value.

The abnormality determiner determines a problem with or abnormalities of the steering torque detection value based on the first turning angle and the second turning angle.

In the present disclosure, abnormalities of the steering torque detection value are determined based on the first turning angle and the second turning angle. Thereby, abnormalities of the steering torque detection value can be detected, without multiplexing the steering torque detection value. Further, when the steering torque detection value is multiplexed, an unusual steering torque detection value can be identified.

Further, for example, when a steering torque estimation value is calculated based on the first turning angle and the second turning angle, even when having abnormalities in the steering torque detection value, a drive control of the electric motor may be continued by using the steering torque estimation value.

Additionally, the control section has a steering torque estimator which calculates a steering torque estimation value based on the first turning angle and the second turning angle, and when it is determined by the abnormality determiner that abnormalities exist in the steering torque detection value, the drive controller controls the drive of the electric motor based on the steering torque estimation value instead of the steering torque detection value.

Also, the control section has a learning component to learn at least one of a conversion coefficient used for a calculation of the steering torque estimation value or a zero point correction value.

Further, when a travel distance after a previous learning by the learning component is equal to or greater than a preset distance, or when a number of times of turning ON and OFF of an ignition switch after the previous learning is more than a preset number of times, the learning component re-learns at least one of the conversion coefficient or the zero point correction value.

Moreover, the second detector detects an electric motor rotation angle detection value concerning a turning angle of the electric motor as the second detection value.

Yet further, the steering torque calculator calculates the plural steering torque detection values based on two third detection values, and based on (i) a comparison result of the plural steering torque detection values or (ii) on the first turning angle and the second turning angle, and the abnormality determiner determines the abnormality in at least one of the plural steering torque detection values.

In addition, the drive controller controls the drive of the electric motor based on the normal steering torque detection value.

Also, when it is determined by the abnormality determiner that abnormalities exist in the steering torque detection value, the drive controller controls the drive of the electric motor so that the supplemental torque is outputted as an abnormal-time supplemental torque that is equal to or less than a normal-time supplemental torque which is a supplemental torque at a time when the steering torque detection value is normal.

Furthermore, the abnormal-time supplemental torque has a value which is calculated as a product of the normal-time supplemental torque and a predetermined coefficient that is equal to or less than 1.

Moreover, the drive controller gradually decreases the supplemental torque at a time of having abnormalities.

Even further, when it is determined by the abnormality determiner that abnormalities exist in the steering torque detection value, the drive controller controls the drive of the electric motor so that the supplemental torque is outputted as a predetermined torque according to a steering direction of the steering member.

Additionally, an abnormality notifier, in the control section, notifies the driver of abnormalities in the steering torque detection value when the abnormality determiner determines that the abnormalities exist in the steering torque detection value.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, a steering controller of the present disclosure is described based on the drawings.

Hereafter, in the following embodiments, the same numerals are assigned to the same configurations and components, and the description of the same configurations and components will not be repeated.

(First Embodiment)

The steering controller in the first embodiment of the present disclosure is described based on FIGS. 1-7.

Figure 1:
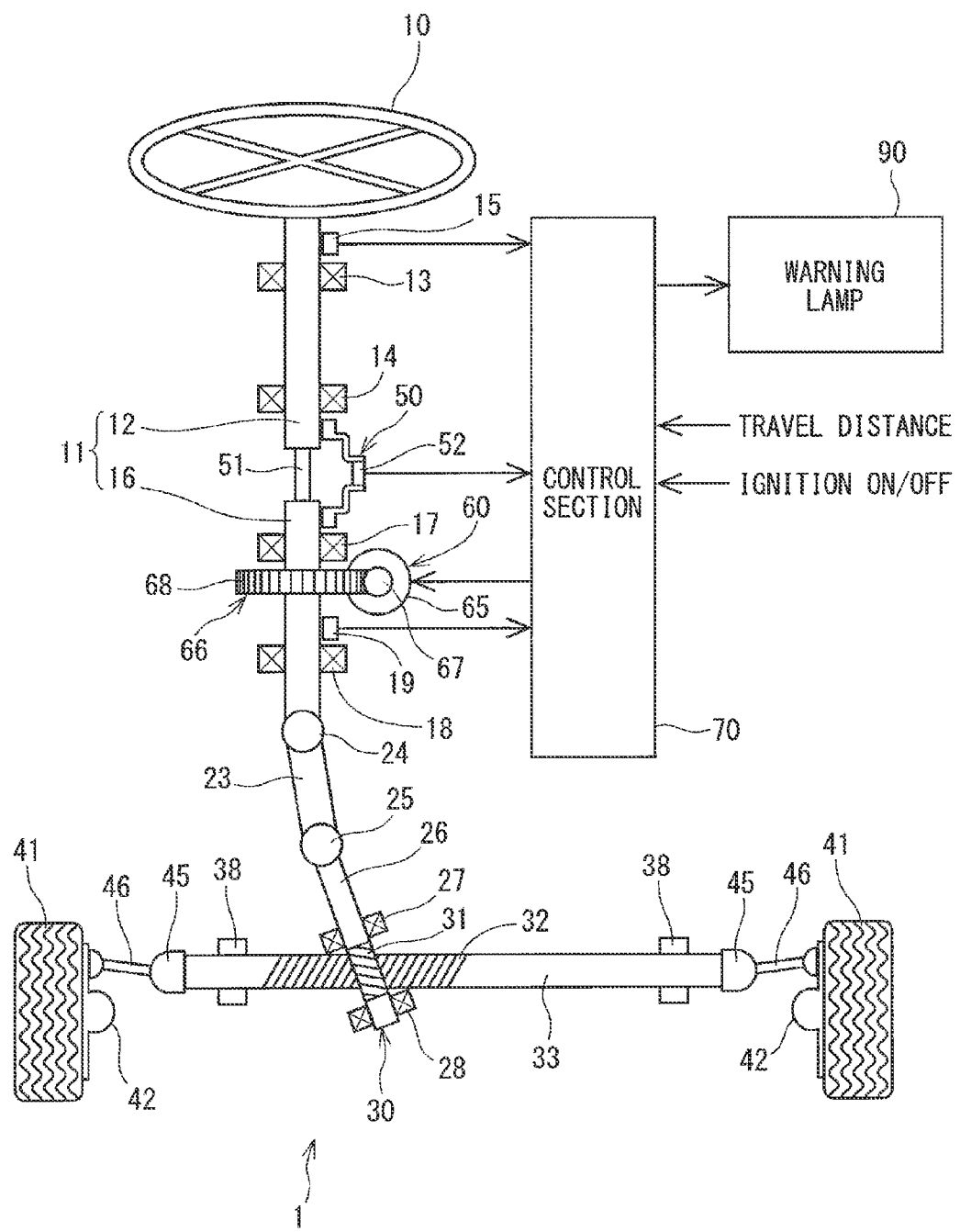
FIG. 1 is an illustration diagram of a steering controller in a first embodiment of the present disclosure.

First, the entire configuration of the steering controller is described based on FIG. 1. The steering controller 1 is provided with a steering wheel 10 serving as a steering member in the claims, a column shaft 11, a steer angle sensor 15 serving as a first detector in the claims, a second shaft rotation angle sensor 19 serving as a second detector in the claims, a torque sensor 50 serving as a torque detector in the claims, a power-steering device 60, a control section 70, together with other components.

The column shaft 11 includes a first column shaft 12 serving as a first shaft in the claims and a second column shaft 16 serving as a second shaft in the claims.

The first column shaft 12 is rotatably supported by first bearings 13 and 14. On one end of the first column shaft 12, the steering wheel 10 steered by the driver is attached. Thereby, the steering wheel 10 and the first column shaft 12 are rotated as one-body structure according to a steering operation of the driver.

The steer angle sensor 15 which detects a turning angle of the first column shaft 12 is disposed on the first column shaft 12. The steer angle sensor 15 detects a first detection value A regarding a steer angle $\theta_A$ that is a turning angle of the first column shaft 12, and outputs the value A to the control section 70.

The second column shaft 16 is disposed on the opposite side of the first column shaft 12 relative to the steering wheel 10. The first column shaft 12 and the second column shaft 16 are connected with a torsion bar 51 of the torque sensor 50. The second column shaft 16 is rotatably supported by second bearings 17 and 18.

The second shaft rotation angle sensor 19 which detects a turning angle of the second column shaft 16 is disposed on the second column shaft 16. The second shaft rotation angle sensor 19 detects a second detection value B regarding a second shaft turning angle $\theta_B$ that is a turning angle of the second column shaft 16, and outputs the value B to the control section 70.

On an opposite side of the second column shaft 16 relative to the first column shaft 12, an intermediate shaft 23 is disposed via an adjustable joint 24. Further, on an opposite side of the intermediate shaft 23 relative to the second column shaft 16, a pinion shaft 26 is disposed via an adjustable joint 25. The pinion shaft 26 is rotatably supported by third bearings 27 and 28.

A steering gearbox 30 comprises a pinion gear 31 and a rack gear 32. The pinion gear 31 is disposed on the pinion shaft 26, and rotates reciprocally (i.e., in one turning direction or the other) together with the pinion shaft 26.

The rack gear 32 is a helical gear disposed on a rack bar 33, and engages with the pinion gear 31. The rack bar 33 is supported by a support member 38, which allows a lateral move of the member 38 to the right and left of the vehicle. Further, on both ends of the rack bar 33, steerable wheels 41 are disposed via a ball joint 45 and a tie rod 46. The steerable wheel 41 rotates on a rotation axis 42. In the present embodiment, the steerable wheel 41, among other wheels of the vehicle, moves (i.e., changes its direction) according to a steering operation of the steering wheel 10, for changing a travel direction of the vehicle.

A driver's steering of the steering wheel 10 is transmitted to the pinion shaft 26 having the pinion gear 31 formed thereon as a turning movement, via column shaft 11 and the intermediate shaft 23. By the engagement of the pinion gear 31 and the rack gear 32, a turning movement of the pinion gear 31 is converted into a translational movement of the rack bar 33 in a lateral direction of the vehicle, and, according to the movement magnitude of the rack bar 33, a steer angle of the steerable wheel 41 is changed. That is, in the present embodiment, it can be restated that the column shaft 11, the intermediate shaft 23, the pinion shaft 26, the steering gearbox 30, and the rack bar 33 constitute a transmission path which transmits a steering torque of the steering wheel 10 to the steerable wheel 41.

The torque sensor 50 comprises the torsion bar 51 and a magnetic sensor 52. The torsion bar 51, which is disposed at a position between the first column shaft 12 and the second column shaft 16, converts the steering torque applied to the steering wheel 10 into a twist displacement. The magnetic sensor 52 detects the steering torque applied to the steering wheel 10 by detecting the twist displacement of the torsion bar 51. The magnetic sensor 52 outputs, to the control section 70, the twist displacement as a third detection value K regarding the steering torque which is input to the steering wheel 10.

The power-steering device 60 has a motor 65 which is an electric motor and a speed reducer 66. In the present embodiment, the power-steering device 60 is disposed on the second column shaft 16, which is what is called as a "column-assist type".

The motor 65 is driven according to the steering torque inputted into the steering wheel 10, and produces a supplemental torque which assists the steering operation of the steering wheel 10 by the driver. The motor 65 in the present embodiment is a three-phase brushless motor.

The speed reducer 66 is a worm gear which comprises a worm 67 and a worm wheel 68, and reduces a speed of turning of the motor 65 and transmits the turning to the second column shaft 16. The worm 67 rotates together with the rotation shaft of the motor 65. The worm wheel 68 is disposed to be rotatable and to have one body structure with the second column shaft 16, and engages with the worm 67. When the motor 65 rotates, the worm 67 rotates, and the worm wheel 68 and the second column shaft 16 also rotate according to the rotation of the warm 67. In such manner, the supplemental torque produced by the rotation of the motor 65 is transmitted to the second column shaft 16, and the steering operation of the steering wheel 10 by the driver is assisted.

The control section 70 is constituted as a well-known computer provided with CPU, ROM, RAM, I/O, together with a bus line for connecting these parts, and the like. The control section 70 obtains travel distance information about a travel distance of the vehicle and IG ON/OFF information about an ON-and-OFF operation of an ignition switch.

Figure 2:
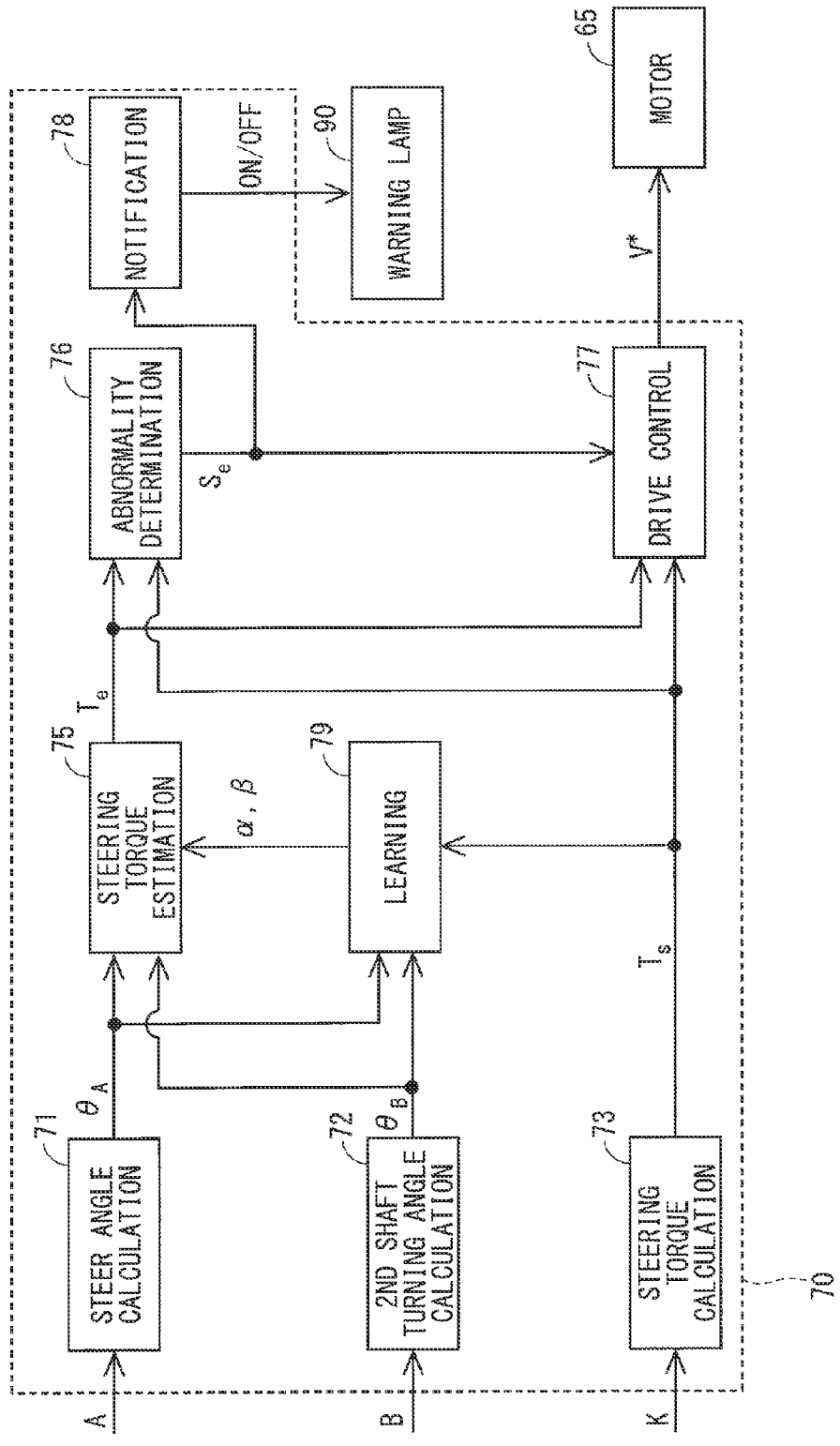
FIG. 2 is a block diagram of a control section in the first embodiment of the present disclosure.

As shown in FIG. 2, the control section 70 has a steer angle calculation part 71, a second shaft turning angle calculation part 72, a steering torque calculation part 73, a steering torque estimation part 75, an abnormality determination part 76, a drive control part 77, a notification part 78, and a learning part 79 together with other components. The steer angle calculation part 71, the second shaft turning angle calculation part 72, the steering torque calculation part 73, the steering torque estimation part 75, the abnormality determination part 76, the drive control part 77, the notification part 78, and the learning part 79 may either be constituted solely as hardware or solely as software, or even as a combination of software and hardware.

The steer angle calculation part 71 obtains the first detection value A outputted from the steer angle sensor 15, and calculates the steer angle $\theta_A$. According to the present embodiment, the steer angle $\theta_A$ takes a positive value when the steering wheel 10 is rotated rightward, and takes a negative value when the steering wheel 10 is rotated leftward.

The second shaft turning angle calculation part 72 obtains the second detection value B outputted from the second shaft rotation angle sensor 19, and calculates second shaft turning angle $\theta_B$.

The steering torque calculation part 73 calculates a steering torque detection value $T_s$ based on the third detection value K outputted from the torque sensor 50.

Further, the controller 1 may also be configured that the torque sensor 50 calculates the steering torque detection value $T_s$ and the steering torque calculation part 73 obtains the calculated value Ts as the "third detection value". Alternatively, the steer angle calculation part 71 may obtain the steer angle $\theta_A$ as the "first detection value", and the second shaft turning angle calculation part 72 may obtain the second shaft turning angle $\theta_B$ as the "second detection value".

In the steering torque estimation part 75, a steering torque estimation value $T_e$ is calculated based on an angle difference value $\theta_d$ derived from the steer angle $\theta_A$ and the second shaft turning angle $\theta_B$.

Here, the calculation method for calculating the steering torque estimation value $T_e$ is described with reference to FIG. 3.

First, the angle difference value $\theta_d$ is represented by the following equation (1).

$$\theta_d = \theta_A - \theta_B \tag{1}$$

Figure 3A:
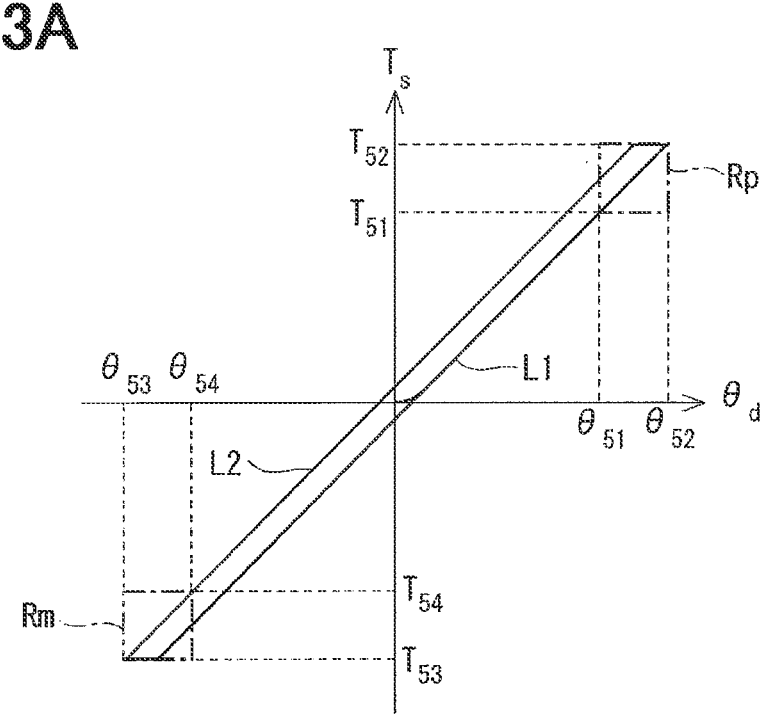
FIGS. 3A/B are graphs of a relationship between a rotation angle difference value and a steering torque in the first embodiment of the present disclosure.
Figure 3B:
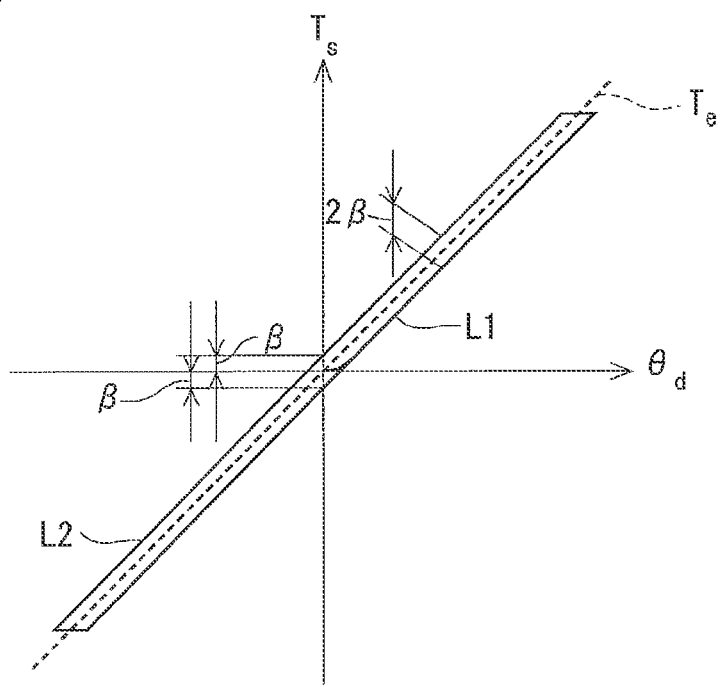

As shown in FIG. 3A, the angle difference value $\theta_d$ and the steering torque detection value $T_s$ are proportionally related. Therefore, in the steering torque estimation part 75, the steering torque estimation value $T_e$ is calculated by using the following equation (2) based on the angle difference value $\theta_d$.

$$T_e = \alpha \times \theta_d \tag{2}$$

Further, a relationship between the angle difference value $\theta_d$ and the steering torque detection value $T_s$ is represented by a solid line L1 when the steering wheel 10 is steered rightward, or is represented by a solid line L2 when the steering wheel 10 is steered leftward. That is, the relationship between the value $\theta_d$ and the value $T_s$ has a hysteresis, which is caused by friction, play, backlash or the like of mechanical elements, when the steering wheel 10 is steered rightward or leftward. According to the present embodiment, a conversion error which is the width of the hysteresis at the time of steering the steering wheel 10 rightward and leftward is set to $2\beta$.

Here, in the steering torque estimation part 75, the steering torque estimation value $T_e$ may be calculated according to the steering direction of the steering wheel 10. More specifically, instead of the above-mentioned formula (2), an equation (3) may be used when the steering wheel 10 is steered rightward, or, an equation (4) may be used when the steering wheel 10 is steered leftward, for the calculation of the steering torque estimation value $T_e$. The steering direction of the steering wheel 10 can be determined based on the angle difference value $\theta_d$ in the present embodiment, i.e., when the angle difference value $\theta_d > 0$, the steering wheel 10 is steered rightward and, when the angle difference value $\theta_d<0$, the steering wheel 10 is steered leftward.

$$T_e = \alpha \times \theta_d - \beta \quad (3)$$

$$T_e = \alpha \times \theta_d + \beta \quad (4)$$

A term $\alpha$ in the equations (2)-(4) is a "conversion coefficient", and $\beta$ is a "zero point correction value". The zero point correction value $\beta$ is ½ of the conversion error $2\beta$.

The conversion coefficient $\alpha$ and the zero point correction value $\beta$ are learned by the learning part 79 when the angle difference value $\theta_d$ and the steering torque detection value $T_s$ are in a positive learning region Rp or a negative learning region Rm. The details of the learning method of the conversion coefficient $\alpha$ and the zero point correction value $\beta$ are mentioned later.

In the abnormality determination part 76, the abnormalities of the steering torque detection value $T_s$ are detected based on the steer angle $\theta_A$ and second shaft turning angle $\theta_B$. According to the present embodiment, the abnormalities of the steering torque detection value $T_s$ are detected by comparing the steering torque detection value $T_s$ and the steering torque estimation value $T_e$ which is calculated based on the steer angle $\theta_A$ and the second shaft turning angle $\theta_B$. More practically, when an absolute value of the difference between the steering torque estimation value $T_e$ and the steering torque detection value $T_s$ is greater than a predetermined determination threshold, it is determined that the steering torque detection value $T_s$ is abnormal. When it is determined that the steering torque detection value $T_s$ is abnormal, an abnormal signal $S_e$ is outputted to the drive control part 77 and to the notification part 78.

Based on the steering torque detection value $T_s$ or the steering torque estimation value $T_e$, the drive of the motor 65 is controlled by the drive control part 77. More specifically, when the steering torque detection value $T_s$ is normal, the drive of the motor 65 is controlled based on the steering torque detection value $T_s$, and, when the steering torque detection value $T_s$ is abnormal, the drive of the motor 65 is controlled based on the steering torque estimation value $T_e$. In the present embodiment, a voltage instruction value V* applied to the motor 65 is calculated by the drive control part 77 based on the steering torque detection value $T_s$ or the steering torque estimation value $T_e$, and the drive of the motor 65 is controlled via an inverter or the like, which are not illustrated.

The notification part 78 controls to illuminate a warning lamp 90 when the steering torque detection value $T_s$ is abnormal. Thereby, the driver is notified of the steering torque detection value $T_s$ being abnormal.

Figure 4:
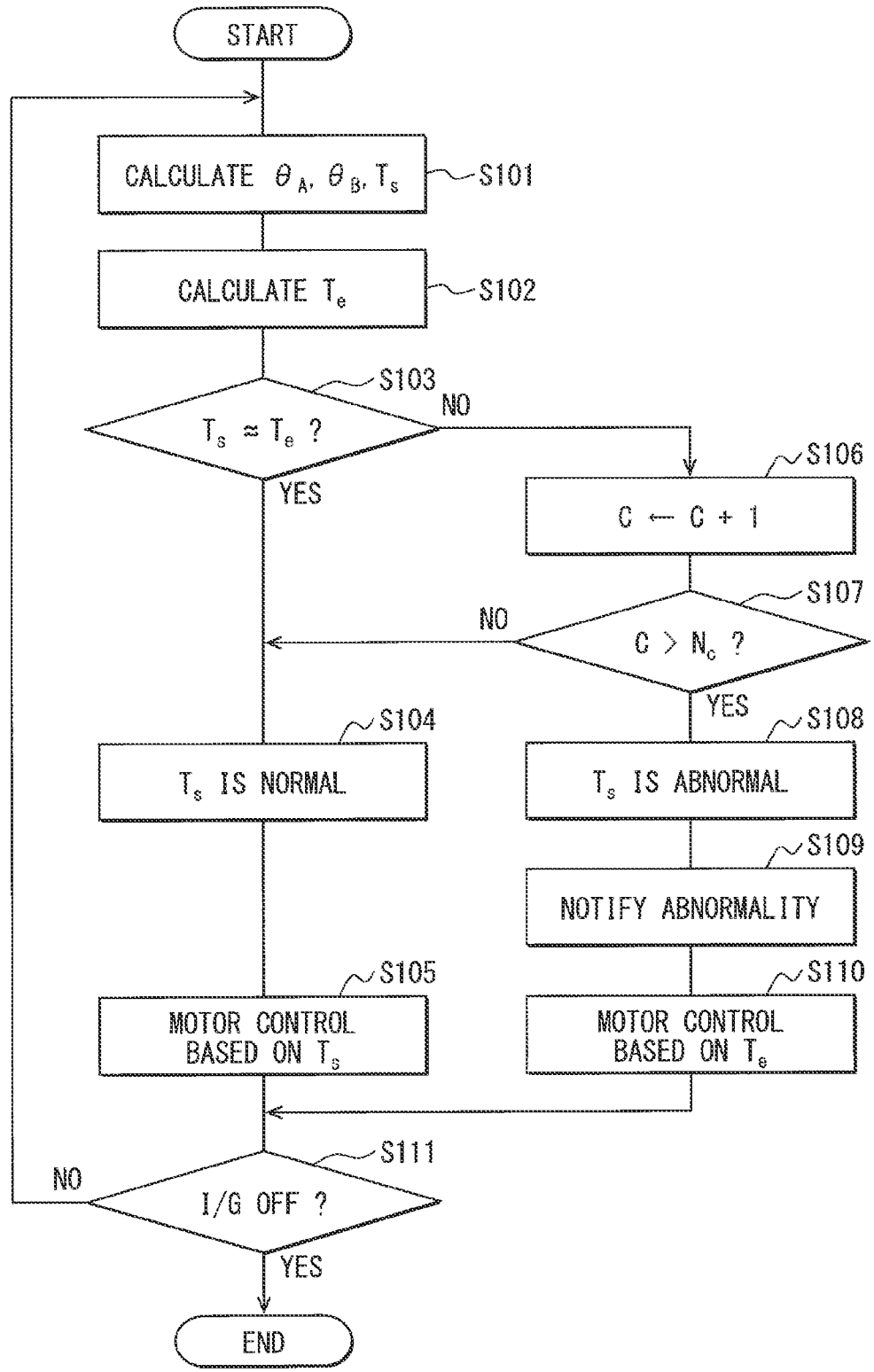
FIG. 4 is a flowchart of an abnormality determination process in the first embodiment of the present disclosure.

Next, an abnormality determination control process is described based on a flowchart shown in FIG. 4. This process is performed by the control section 70 when the ignition switch is turned on. In the present embodiment, an abnormality determination of the steer angle $\theta_A$ and the second shaft turning angle $\theta_B$ is performed by another process, and this process is performed when both of the steer angle $\theta_A$ and the second shaft turning angle $\theta_B$ are normal. The same applies to the other embodiment in the following.

In step S101, the steer angle calculation part 71 obtains the first detection value A, and calculates the steer angle $\theta_A$. Further, the second shaft turning angle calculation part 72 obtains the second detection value B, and calculates the second shaft turning angle $\theta_B$. Then, the steering torque calculation part 73 obtains the third detection value K, and calculates the steering torque detection value $T_s$.

In step S102, the steering torque estimation part 75 calculates the steering torque estimation value $T_e$ based on the steer angle $\theta_A$ and the second shaft turning angle $\theta_B$. Specifically, based on the angle difference value $\theta_d$ derived from the steer angle $\theta_A$ and the second shaft turning angle $\theta_B$, the steering torque estimation value $T_e$ is calculated by one of the above-mentioned equations (1)-(3).

In step S103, it is determined by the abnormality determination part 76 whether the steering torque detection value $T_s$ and the steering torque estimation value $T_e$ match with each other (i.e., have the same values). When the absolute value of difference between the steering torque detection value $T_s$ and the steering torque estimation value $T_e$ is equal to or less than the predetermined determination threshold, it is determined that the steering torque detection value $T_s$ and the steering torque estimation value $T_e$ match with each other. When it is determined that the steering torque detection value $T_s$ and the steering torque estimation value $T_e$ do not match with each other (i.e., when the absolute value of difference between the steering torque detection value $T_s$ and the steering torque estimation value $T_e$ is greater than the predetermined determination threshold) (S103: NO), the process proceeds to S106. When it is determined that the steering torque detection value $T_s$ and the steering torque estimation value $T_e$ match with each other (i.e., when the absolute value of difference between the steering torque detection value $T_s$ and the steering torque estimation value $T_e$ is equal to or less than the predetermined determination threshold) (S103: YES), the process proceeds to S104.

In step S104, it is determined that the steering torque detection value $T_s$ is normal.

In step S105, the drive of the motor 65 is controlled by the drive control part 77 based on the steering torque detection value $T_s$.

In step S106, which occurs after it is determined that the steering torque detection value $T_s$ and the steering torque estimation value $T_e$ do not match with each other (S103: NO), a count value C of a delay counter is incremented.

In step S107, it is determined whether the count value C of the delay counter is greater than a predetermined number of times Nc of determination. When the count value C is equal to or less than the predetermined number of times Nc of determination (S107: NO), the process proceeds to S104. When the count value C is greater than the predetermined number of times Nc of determination (S107: YES), the process proceeds to S108. Thus, by providing the delay counter, an erroneous determination of the abnormality under the influence of a noise or the like is prevented.

In step S108, it is determined that the steering torque detection value $T_s$ is abnormal, and the abnormal signal $S_e$ is outputted to the drive control part 77 and to the notification part 78.

In step S109, the driver is notified of the steering torque detection value $T_s$ being abnormal by the notification part 78. In the present embodiment, a signal for lighting the warning lamp 90 is outputted from the notification part 78, and the warning lamp 90 is turned on.

In step S110, the drive of the motor 65 is controlled based on the steering torque estimation value $T_e$.

In step S111, it is determined whether the ignition switch is turned off. When the ignition switch is not being turned off (S111: NO), the process returns to step S101. When the ignition switch is being turned off (S111: YES), the process is finished.

Figure 5:
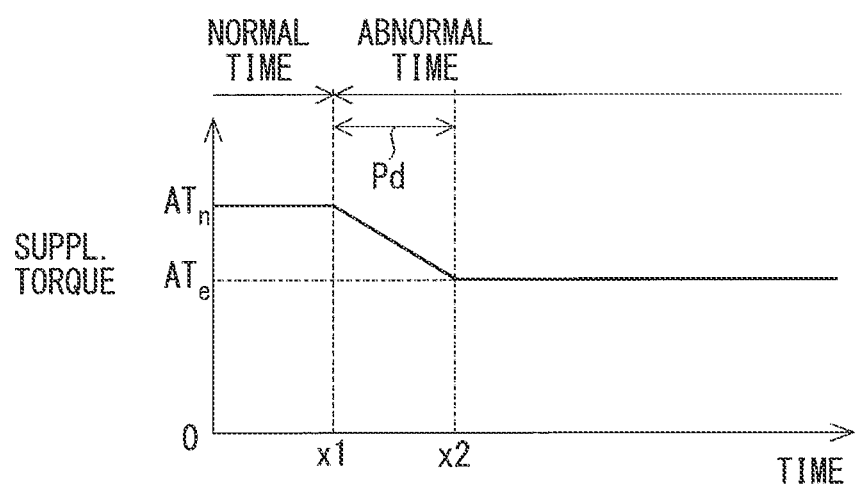
FIG. 5 is a graph of a drive control of an electric motor in the first embodiment of the present disclosure.

Here, a control of the motor 65 in step S105 and step S110 is described based on FIG. 5. In FIG. 5, it is assumed that a vehicle speed and the steer angle $\theta_A$ are constant, for example.

An abnormal-time supplemental torque $AT_e$, which is a supplemental torque from the motor 65 at a time of having abnormalities, i.e., when it is determined that the steering torque detection value $T_s$ is abnormal, is, as shown in FIG. 5, configured to be equal to or less than a normal-time supplemental torque $AT_n$, which is a supplemental torque at a time of having no abnormalities.

In the present embodiment, the supplemental torque is configured to gradually decrease from a time x1 at which the steering torque detection value $T_s$ is determined as abnormal, and, at time x2, the supplemental torque outputted from the motor 65 is decreased to be equal to the abnormal-time supplemental torque $AT_e$ which is equal to a product of (i) the normal-time supplemental torque $AT_n$ a time when the steering torque detection value $T_s$ is normal and (ii) a coefficient that is smaller than 1. Further, in the present embodiment, a gradual decrease period Pd, which is a time period for gradually decreasing the supplemental torque after determining that the steering torque detection value $T_s$ is abnormal, is provided. By providing the gradual decrease period Pd, a sudden change of the supplemental torque is prevented.

Further, when abnormalities are detected in the steering torque detection value $T_s$, the torque outputted from the motor 65 may be changed from the normal-time supplemental torque $AT_n$ to the abnormal-time supplemental torque $AT_e$ without having the gradual decrease period Pd.

According to the present embodiment, since, when having an abnormal steering torque detection value $T_s$, the supplemental torque is decreased as compared with a normal time, a force required for the steering operation of the steering wheel 10 becomes large. Thereby, abnormalities in the steering controller 1 are more readily recognized by the driver, in comparison to simply warning the driver through the lighting of the warning lamp 90.

Then, the learning method for learning the conversion coefficient $\alpha$ used for the calculation of the steering torque estimation value $T_e$ based on the steer angle $\theta_A$ and the second shaft turning angle $\theta_B$ and the learning method for learning the zero point correction value $\beta$ are described based on FIGS. 3A/B, 6, and 7.

According to the present embodiment, when the steering torque detection value $T_s$ and the angle difference value $\theta_d$ are in the positive learning region Rp or the negative learning region Rm, which are shown by a dashed-dotted line in FIGS. 3A/B, a learning process for learning the conversion coefficient $\alpha$ and the zero point correction value $\beta$ is performed. Since the conversion coefficient $\alpha$ is calculated as an inclination of a linear function, it is desirable that the positive learning region Rp and the negative learning region Rm are configured to be as far apart as possible from each other, for the reduction of a calculation error. Further, for the purpose of explanation, the positive learning region Rp and the negative learning region Rm are drawn in an expanded form in FIGS. 3A/B. However, it is actually desirable to have the regions Rp and Rm to be as small as possible, as long as the value $T_s$ is calculable. According to the present embodiment, the positive learning region Rp is defined as a range between $\theta_{51}$ and $\theta_{52}$ for the angle difference value $\theta_d$ (i.e., $\theta_{51} \leq \theta_d \leq \theta_{52}$) and as a range between $T_{51}$ and $T_{52}$ for the steering torque detection value $T_s$ (i.e., $T_{51} \leq T_s \leq T_{52}$). Further, the negative learning region Rm is defined as a range between $\theta_{53}$ and $\theta_{54}$ for the angle difference value $\theta_d$ (i.e., $\theta_{53} \leq \theta_d \leq \theta_{54}$) and as a range between $T_{53}$ and $T_{54}$ for the steering torque detection value $T_s$ (i.e., $T_{53} \leq T_s \leq T_{54}$).

Figure 6:
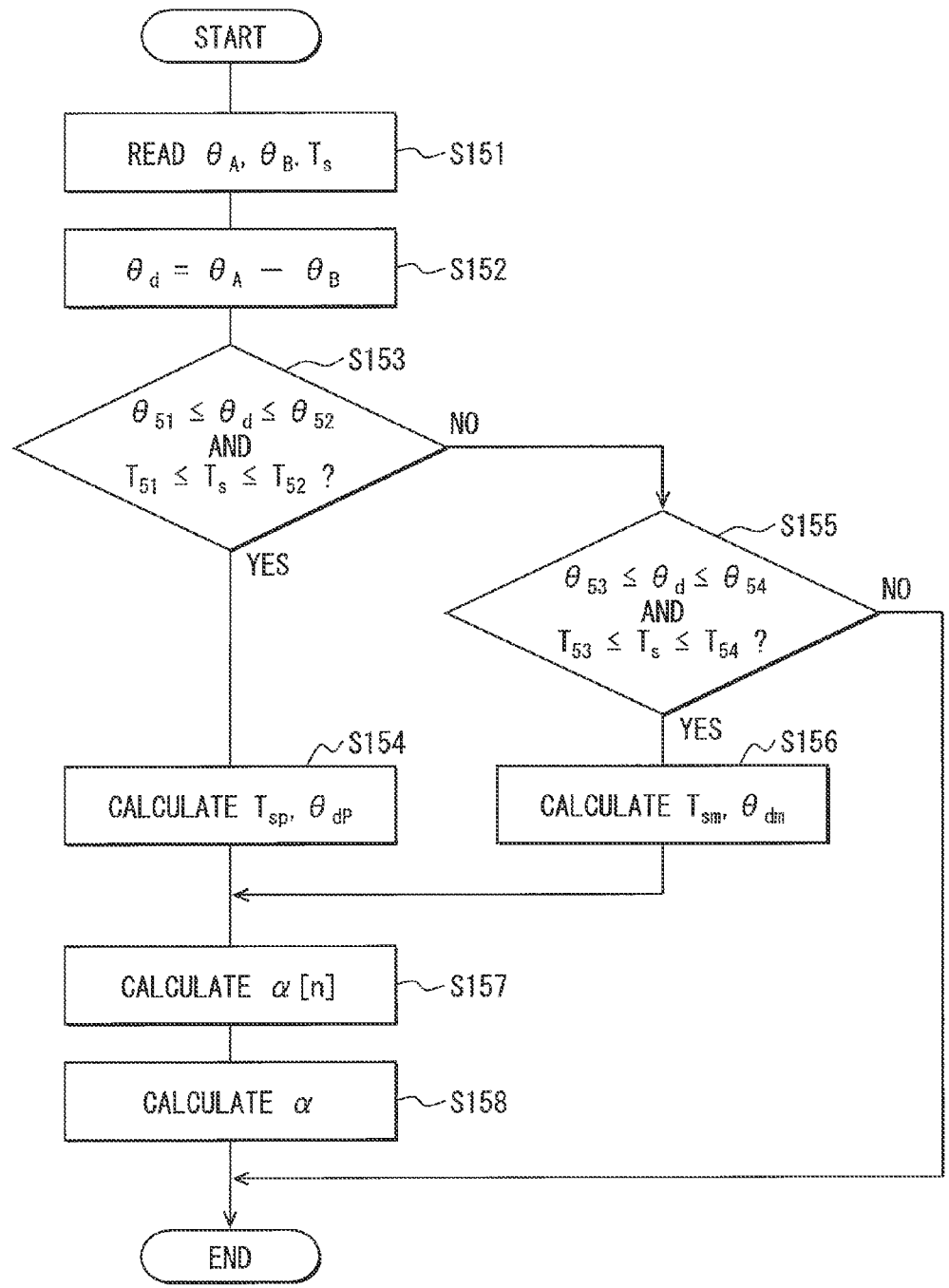
FIG. 6 is a flowchart of a learning method of a conversion coefficient in the first embodiment of the present disclosure.
Figure 7:
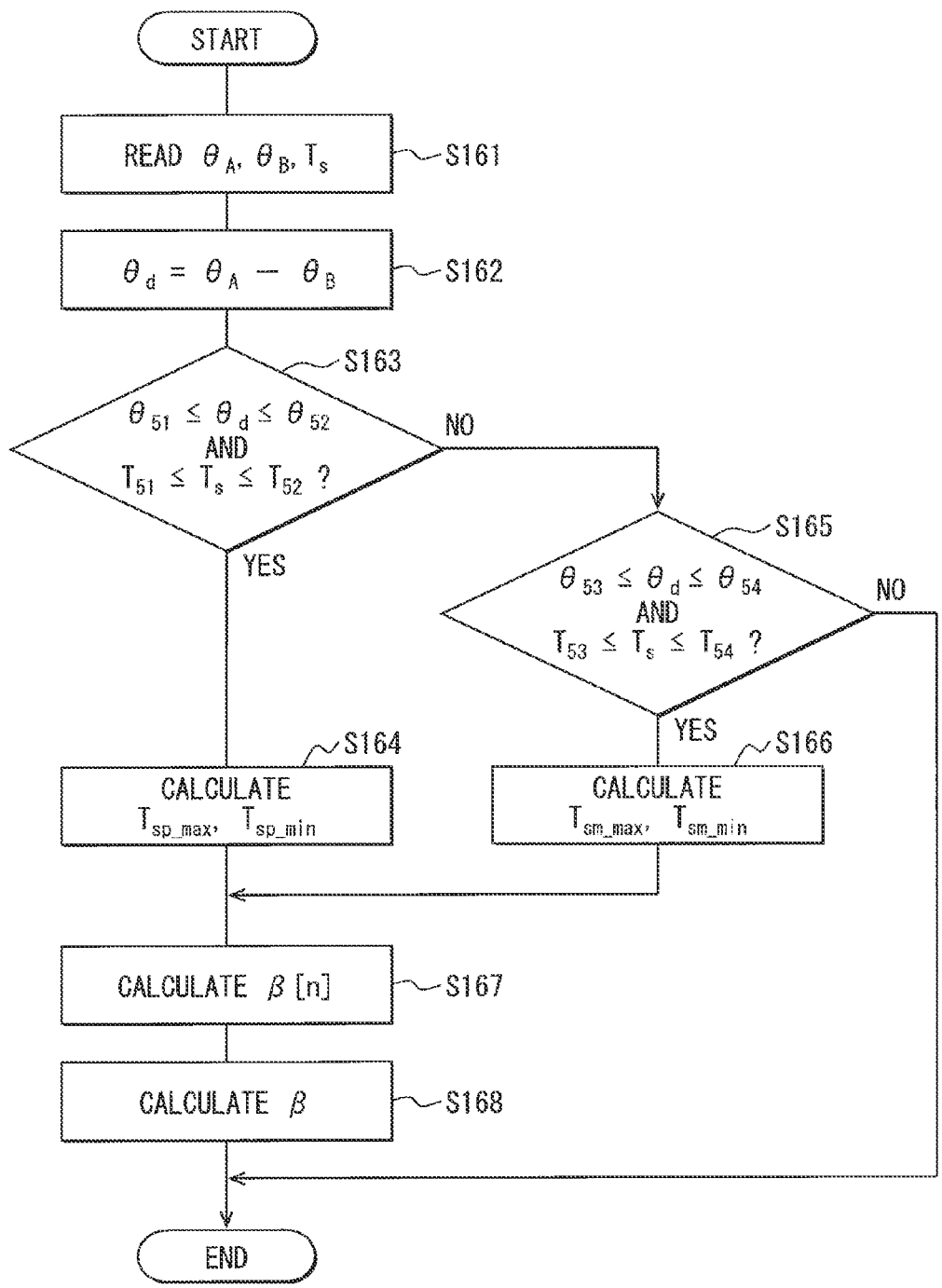
FIG. 7 is a flowchart of a learning method of a zero point correction value in the first embodiment of the present disclosure.

In the learning process of FIGS. 6 and 7, the process is always performed at predetermined intervals while the ignition switch is turned ON.

First, the learning process of the conversion coefficient $\alpha$ is described based on a flowchart in FIG. 6.

In step S151, the process reads the steer angle $\theta_A$, the second shaft turning angle $\theta_B$, and the steering torque detection value $T_s$.

In step S152, the process calculates the angle difference value $\theta_d$.

In step S153, the process determines whether the angle difference value $\theta_d$ and the steering torque detection value $T_s$ are in the positive learning region Rp. When the angle difference value $\theta_d$ and the steering torque detection value $T_s$ are determined to not in the positive learning region Rp (S153: NO), that is, when the angle difference value $\theta_d$ is less than $\theta_{51}$ or greater than $\theta 52$ or when the steering torque detection value $T_s$ is less than $T_{51}$ or greater than $T_{52}$, the process proceeds to step S155. When the angle difference value $\theta_d$ and the steering torque detection value $T_s$ are determined to be in an inside of the positive learning region Rp (S153: YES), that is, when the angle difference value $\theta_d$ is equal to or greater than $\theta_{51}$ and equal to or less than $\theta_{52}$ and when the steering torque detection value $T_s$ is equal to or greater than $T_{51}$ and equal to or greater than $T_{52}$, the process proceeds to step S154.

In step S154, the process calculates a positive steering torque detection value $T_{sp}[n]$ and a positive angle difference value $\theta_{dp}[n]$ which are used for the calculation of a current value of the conversion coefficient $\alpha[n]$. According to the present embodiment, the process calculates the positive steering torque detection value $T_{sp}[n]$ for the current calculation as a weighted average of the positive steering torque detection value $T_{sp}[n-1]$ used for the last calculation and the steering torque detection value $T_s$ read in step S151. Similarly, the process calculates the positive angle difference value $\theta_{dp}[n]$ for the current calculation as a weighted average of the positive angle difference value $\theta_{dp}[n-1]$ used for the last calculation and the angle difference value $\theta_d$ calculated in step S152. Further, as $T_{sp}[n-1]$ and $\theta_{dp}[n-1]$ which are used for the first-time calculation, it is desirable to set up predetermined values in advance. The equations for calculating the positive the steering torque detection value $T_{sp}$ and the positive angle difference value $\theta_{dp}$ are shown as calculation equations (5) and (6). Signs a and b in those equations are coefficients concerning weighting, and thus can be arbitrarily set up. The values of a and b may be set as a=b=1, for calculating the above-described values as arithmetic averages.

$$T_{sp}[n] = \frac{aT_{sp}[n-1] + bT_s}{a+b} \qquad (5)$$

$$\theta_{dp}[n] = \frac{a\theta_{dp}[n-1] + b\theta_d}{a+b} \qquad (6)$$

In step S155 which occurs after the determination that the angle difference value $\theta_d$ and the steering torque detection value $T_s$ are not in the positive learning region Rp (S153: NO), the process determines whether the angle difference value $\theta_d$ and the steering torque detection value $T_s$ are in the negative learning region Rm. When the angle difference value $\theta_d$ and the steering torque detection value $T_s$ are determined not to be in the negative learning region Rm (S155: NO), that is, when it is determined that the angle difference value $\theta_d$ is less than $\theta_{53}$ or greater than $\theta_{54}$ or when the steering torque detection value $T_s$ is less than $T_{53}$ or greater than $T_{54}$, the process does not learn the conversion coefficient $\alpha$, and finished the current process. When it is determined that the angle difference value $\theta_d$ and the steering torque detection value $T_s$ are in the negative learning region Rm (S155: YES), that is, when it is determined that the angle difference value $\theta_d$ is equal to or greater than $\theta_{53}$ and equal to or less than $\theta_{54}$ and when the steering torque detection value $T_s$ is equal to or greater than $T_{53}$ and equal to or less than $T_{54}$, the process proceeds to step S156.

In step S156, the process calculates the negative steering torque detection value $T_{sm}$ [n] and the negative angle difference value $\theta_{dm}$ [n] which are used for the calculation of a current value of the conversion coefficient $\alpha$ [n].

According to the present embodiment, the process calculates the negative steering torque detection value $T_{sm}$ [n] for the current calculation as a weighted average of the negative steering torque detection value $T_{sm}$ [n−1] used for the last calculation and the steering torque detection value $T_s$ acquired in step S151 is calculated. Similarly, the process calculates the negative angle difference value $\theta_{dm}$ [n] which is used for the current calculation as a weighted average of the negative angle difference value $\theta_{dm}$ [n−1] used for the last calculation and the angle difference value $\theta_d$ calculated in step S152. Further, as $T_{sm}$ [n−1] and $\theta_{dm}$ [n−1] which are used for the first-time calculation, it is desirable to set up predetermined values as initial values in advance.

The equations for calculating the negative steering torque detection value $T_{sm}$ and the negative angle difference value $\theta_{dm}$ are shown as calculation equations (7) and (8). Signs a and b in those equations are coefficients concerning weighting, and thus can be arbitrarily set up. The values of a and b may be set as a=b=1, for calculating the above-described values as arithmetic averages.

$$T_{sm}[n] = \frac{aT_{sm}[n-1] + bT_s}{a+b} \tag{7}$$

$$\theta_{dm}[n] = \frac{a\theta_{dp}[n-1] + b\theta_d}{a+b} \tag{8}$$

In step S157 which occurs after step S154 or step S156, the process calculates the current value $\alpha$ [n] of the conversion coefficient by using the positive the steering torque detection value $T_{sp}$ [n] and the positive angle difference value $\theta_{dp}$ [n], as well as by using the negative steering torque detection value $T_{sm}$ [n] and the negative angle difference value $\theta_{dm}$ [n]. Regarding two value combinations, i.e., the positive the steering torque detection value $T_{sp}$ [n] and the positive angle difference value $\theta_{dp}$ [n] and the negative steering torque detection value $T_{sm}$ [n] and the negative angle difference value $\theta_{dm}$ [n], one of two combinations is calculated either in step S154 or S156. Therefore, regarding the other one of two combinations, previous values are inherited as the current values.

The current value $\alpha$ [n] of the conversion coefficient is calculated as an inclination between two points, that is, a point in the positive learning region Rp and a point in the negative learning region Rm. A calculation equation of a current value $\alpha$ [n] of the conversion coefficient is shown as an equation (9).

$$\alpha[n] = \frac{T_{sp}[n] - T_{sm}[n]}{\theta_{dp}[n] - \theta_{dm}[n]} \tag{9}$$

In step S158, based on the current value $\alpha$ [n] and the previous value $\alpha$ [n−1] of the conversion coefficient, the process calculates the conversion coefficient $\alpha$ as a weighted arithmetic average. A calculation equation of the conversion coefficient $\alpha$ is shown in an equation (10). Signs c and d in the equation are the coefficients concerning weighting, and can thus be set up arbitrarily. The values c and d may be set as c=d=1, for calculating the above-described values as arithmetic averages. The calculated conversion coefficient $\alpha$ is used for the calculation of the steering torque estimation value $T_e$ as well as used as the previous value $\alpha$ [n−1] in the next learning process of the conversion coefficient $\alpha$. Further, as the value $\alpha$ [n−1] used for the first-time calculation, it is desirable to set up a predetermined value as an initial value in advance.

$$\alpha = \frac{c\alpha[n-1] + d\alpha[n]}{c+d} \tag{10}$$

Next, the learning process of the zero point correction value $\beta$ is described based on a flowchart in FIG. 7. Since the zero point correction value $\beta$ is not used for the calculation of the steering torque estimation value $T_e$, when in case that the calculation of the steering torque estimation value $T_e$ is performed by using the above-mentioned equation (2), it is not necessary to perform this learning process.

Processes of S161-S163 are the same as that of S151-S153 in FIG. 6.

When it is determined that the angle difference value $\theta_d$ and the steering torque detection value $T_s$ are not in the positive learning region Rp (S163: NO), the process proceeds to step S165, and, when it is determined that the angle difference value $\theta_d$ and the steering torque detection value $T_s$ are in the positive learning region Rp (S163: YES), the process proceeds to step S164.

In step S164, the process calculates a maximum value $T_{sp\_max}$ of the positive steering torque detection value and a minimum value $T_{sp\_min}$ of the positive steering torque detection value. Here, the process compares the maximum value $T_{sp\_max}$ [n−1] among the positive steering torque detection values up to the last time with the steering torque detection value $T_s$ read in step S161, and determines a larger one of the two values as the maximum value $T_{sp\_max}$ among the positive steering torque detection values. Further, the process compares the minimum value $T_{sp\_min}$ [n−1] among the positive steering torque detection values up to the last time with the steering torque detection value $T_s$ read in step S161, and determines a smaller one of the two values as the minimum value $T_{sp\_min}$ among the positive steering torque detection values.

In step S165, which occurs after the determination that the angle difference value $\theta_d$ and the steering torque detection value $T_s$ are in the positive learning region Rp (S163: NO), is the same step as the one in step S155 in FIG. 6, and, when it is determined that the angle difference value $\theta_d$ and the steering torque detection value $T_s$ are not in the negative learning region Rm (S165: NO), the process does not learn the zero point correction value $\beta$, and the current process is finished. When it is determined that the angle difference value $\theta_A$ and the steering torque detection value $T_s$ are in the negative learning region Rm (S165: YES), the process proceeds to step S166.

In step S166, the process calculates the maximum value $T_{sm\_max}$ of the negative steering torque detection value and the minimum value $T_{sm\_min}$ of the negative steering torque detection value. Here, similarly to the positive calculation, the process compares the maximum value $T_{sm\_max}$ [n−1] among the negative steering torque detection values up to the last time with the steering torque detection value $T_s$ read in step S161, and determines a larger one of the two values as the maximum value $T_{sm\_max}$ among the negative steering torque detection values. Further, the process compares the minimum value $T_{sm\_min}$ [n−1] among the negative steering torque detection values up to the last time with the steering torque detection value $T_s$ that is read in step S161, and determines a smaller one of the two values as the minimum value $T_{sm\_min}$ among the negative steering torque detection values.

In step S167 which occurs after step S164 or step S166, the process calculates the current value β [n] of the zero point correction value by using the maximum value $T_{sp\_max}$ of the positive steering torque detection value and the minimum value $T_{sp\_min}$ of the positive steering torque detection value, as well as by using the maximum value $T_{sm\_max}$ of the negative steering torque detection value and the minimum value $T_{sm\_min}$ of the negative steering torque detection value. A calculation equation of the current value β [n] of the zero point correction value is shown as an equation (11).

$$\beta[n] = \frac{1}{2} \times \frac{|T_{sp\_max} - T_{sp\_min}| + |T_{sm\_max} - T_{sm\_min}|}{2} \quad (11)$$

In step S168, based on the current value β [n] and the previous value β [n−1] of the zero point correction value, the process calculates the zero point correction value β as a weighted arithmetic average. A calculation equation of the zero point correction value β is shown as an equation (12). Signs c and d in the equation are the coefficients concerning weighting, and can thus be set up arbitrarily. The values c and d may be set up as c=d=1, for calculating the above-described values as arithmetic averages. The calculated zero point correction value β is used for the calculation of the steering torque estimation value $T_e$ as well as used as the previous value β [n−1] in the next learning process of the zero point correction value β. Further, as the value β [n−1] used for the first-time calculation, it is desirable to set up a predetermined value as an initial value in advance.

$$\beta = \frac{c\beta[n-1] + d\beta[n]}{c+d} \quad (12)$$

According to the present embodiment, since the zero point correction value β is calculated based on an average value of the difference between the maximum value and the minimum value in the positive learning region Rp and also based on an average value of the difference between the maximum value and the minimum value in the negative learning region Rm, an influence of a noise and the like on the correction value is reduced.

The learning processes shown in FIGS. 6 and 7 may preferably be performed in a state in which a power source voltage provided by a non-illustrated power source and the like is stable and the obtained signal is also stable. Therefore, a signal determination step which determines whether the obtained signal is stable may be provided either as a step before step S151 in FIG. 6 or a step before step S161 in FIG. 7, or may be provided either as a step between steps S151 and S152 in FIG. 6 or a step between steps S161 and S162 in FIG. 7.

The process in step S158 of FIG. 6 may be omitted, and the current value α [n] of the conversion coefficient calculated in step S157 may be used for the calculation of the steering torque estimation value $T_e$. Similarly, the process in step S168 of FIG. 7 may be omitted, and the current value β [n] of the zero point correction value calculated in step S167 may be used for the calculation of the steering torque estimation value $T_e$.

As fully described in detail in the above, (1) the steering controller 1 in the first embodiment is provided with the first column shaft 12, the second column shaft 16, the torque sensor 50, the power-steering device 60, and the control section 70. The first column shaft 12 is connected with the steering wheel 10 that is steered by the driver. The second column shaft 16, which is in connection with the first column shaft 12, constitutes a transmission path for transmitting the steering torque that is inputted to the steering wheel 10 to the steerable wheel 41.

The steer angle sensor 15 detects the first detection value A concerning the turning angle of the first column shaft 12. The second shaft rotation angle sensor 19 detects the second detection value B concerning the turning angle of the second column shaft 16. The torque sensor 50 is formed at a position between the first column shaft 12 and the second column shaft 16, and detects the third detection value K concerning the steering torque inputted to the steering wheel 10.

The power-steering device 60 is disposed on the steerable wheel 41 side relative to the torque sensor 50, and has the motor 65 which outputs the supplemental torque which assists the steering operation of the steering wheel 10 by the driver.

The control section 70 has the steer angle calculation part 71, the second shaft turning angle calculation part 72, the steering torque calculation part 73, the drive control part 77, and the abnormality determination part 76. The steer angle calculation part 71 calculates the steer angle $\theta_A$ which is a turning angle of the first column shaft 12 based on the first detection value A. The second shaft turning angle calculation part 72 calculates the second shaft turning angle $\theta_B$ which is a turning angle of the second column shaft 16 based on the second detection value B. The steering torque calculation part 73 calculates the steering torque detection value $T_s$ based on the third detection value K. The drive control part 77 controls the drive of the motor 65 based on the steering torque detection value $T_s$.

The abnormality determination part 76 determines abnormalities in the steering torque detection value $T_s$ based on the steer angle $\theta_A$ and the second shaft turning angle $\theta_B$.

According to the present embodiment, based on the difference between the steer angle $\theta_A$ and the second shaft turning angle $\theta_B$, the abnormalities of the steering torque detection value $T_s$ are determined. More specifically, after the calculation of the steering torque estimation value $T_e$ based on the difference between the steer angle $\theta_A$ and the second shaft turning angle $\theta_B$, when the steering torque detection value $T_s$ and the steering torque estimation value $T_e$ do not match with each other, it is determined that the steering torque detection value $T_s$ is abnormal.

According to the present embodiment, based on the steer angle $\theta_A$ and the second shaft turning angle $\theta_B$, the abnormalities of the steering torque detection value $T_s$ are determined. Thereby, the abnormalities of the steering torque detection value $T_s$ are determined, without multiplexing the steering torque detection value $T_s$. Further, if the steering torque detection value $T_s$ is multiplexed, an abnormal steering torque detection value $T_s$ is specifically determined.

When the steering torque detection value $T_s$ is triplicated by having three or more torque sensors 50 and the like, the abnormal steering torque detection value $T_s$ can be specifically determined by a majority decision. However, such configuration increases the number of parts, increases a volume size, and/or causes an increase of the cost.

According to the present embodiment, the steer angle $\theta_A$ detected by the steer angle sensor 15 is used for the detection of abnormalities of the torque sensor 50. Since the steer angle sensor 15 is configured to be usable in an antiskid brake system (e.g., an Electronic Stability Control), for example, when a vehicle has such antiskid brake system, the abnormalities of the steering torque detection value $T_s$ can be detected without additionally using the steer angle sensor 15 for the detection of such value $T_s$. Further, as compared with the multiplexing of the steering torque detection value $T_s$, the steering controller 1 has a fewer number of components, thereby having a smaller volume.

In the above configuration, for the reduction of the driver's steering load, the steering controller 1 controls the drive of the motor 65 based on the steering torque detection value $T_s$ detected by the torque sensor 50, and generates the supplemental torque. When the steering torque detection value $T_s$ is abnormal, the steerable wheels 41 may possibly be steered in an unintended direction, which is not intended by the driver. Thus, by stopping the drive of the motor 65 when the steering torque detection value $T_s$ is abnormal, the steering of the steerable wheels 41 in the unintended direction is avoided.

On the other hand, in some cases, the driver's steering operation for steering the steering wheel 10 is used to provide only 5 to 10% of a required torque that is required for steering the steerable wheels 41, while remaining 90 to 95% of the required torque is provided by the power-steering device 60. That is, when the power-steering device 60 is configured to output such a big assist torque as compared with the steering torque provided by the driver, an intended steering operation that is intended by the driver may become difficult if the drive of the motor 65 is stopped.

(2) The control section 70 of the present embodiment has the steering torque estimation part 75 which calculates the steering torque estimation value $T_e$ based on the steer angle $\theta_A$ and the second shaft turning angle $\theta_B$. Further, when it is determined that the steering torque detection value $T_s$ is abnormal by the abnormality determination part 76, the drive control part 77 controls the drive of the motor 65 based on the steering torque estimation value $T_e$, instead of based on the steering torque detection value $T_s$. According to the present embodiment, the steering torque estimation value $T_e$ is calculated based on the angle difference value $\theta_d$ which is the difference between the steer angle $\theta_A$ and the second shaft turning angle $\theta_B$.

In such manner, since the drive of the motor 65 may be continued based on the steering torque estimation value $T_e$ even when the steering torque detection value $T_s$ is abnormal, the driver's steering load is reduced even in such case.

(3) Further, when it is determined that the steering torque detection value $T_s$ is abnormal by the abnormality determination part 76, the drive control part 77 controls the drive of the motor 65 so that the abnormal-time supplemental torque $AT_e$ is outputted which is equal to or less than the normal-time supplemental torque $AT_n$ that is a torque when the steering torque detection value $T_s$ is normal.

Thereby, even when the steering torque detection value $T_s$ is abnormal, the drive of the motor 65 may be continued and the driver's steering load is reduced. Further, since the abnormal-time supplemental torque $AT_e$, which is a torque when the steering torque detection value $T_s$ is abnormal, is configured to be equal to or less than the normal-time supplemental torque $AT_n$, the required torque for the driver to perform the steering operation of the steering wheel 10 is equal to or greater than the normal time. Therefore, the driver can readily recognize that the steering controller 1 has abnormalities.

(4) Specifically, the abnormal-time supplemental torque $AT_e$ is configured to have a value which is a product of the normal-time supplemental torque $AT_n$ and a coefficient that is equal to or less than 1. Thereby, even when the steering torque detection value $T_s$ is abnormal, the driver's steering load can be reduced according to the steering torque provided by the driver.

(5) Further, the control section 70 is provided with the notification part 78 notifying the driver of abnormalities when it is determined by the abnormality determination part 76 that the steering torque detection value $T_s$ is abnormal. Thereby, abnormalities in the steering controller 1 are appropriately notified to the driver.

(6) The control section 70 is further provided with the learning part 79 which learns the conversion coefficient $\alpha$ and the zero point correction value $\beta$ that are used for the calculation of the steering torque estimation value $T_e$ based on the steer angle $\theta_A$ and the second shaft turning angle $\theta_B$.

By learning the conversion coefficient $\alpha$ and the zero point correction value $\beta$, the steering torque estimation value $T_e$ is more appropriately calculated according to (i) the sensor errors of the steer angle sensor 15, the second shaft rotation angle sensor 19, and the torque sensor 50 and/or (ii) the variation of the individual machine structures of the speed reducer 66 and the like. Further, in the present embodiment, since the conversion coefficient $\alpha$ and the zero point correction value $\beta$ are always calculated, the steering torque estimation value $T_e$ is calculated appropriately according to wear of the machine structure of the speed reducer 66 and the like as well as a change caused by the aging degradation.

In the present embodiment, the control section 70 serves as "a first rotation angle calculator", "a second rotation angle calculator", "a steering torque calculator", "a drive controller", "an abnormality determiner", "a steering torque estimator", "a learning component", and "an abnormality notifier". More specifically, the steer angle calculation part 71 constitutes "a first rotation angle calculator", the second shaft turning angle calculation part 72 constitutes "a second rotation angle calculator" and the steering torque calculation part 73 constitutes "a steering torque calculator". Further, the drive control part 77 constitutes "a drive controller", the abnormality determination part 76 constitutes "an abnormality determiner", the steering torque estimation part 75 constitutes "a steering torque estimator", the learning part 79 constitutes "a learning component", and the notification part 78 constitutes "an abnormality notifier".

Further, step S101 in FIG. 4 functions as processes of "a first rotation angle calculator", "a second rotation angle calculator", and "a steering torque calculator", and steps S105 and S110 function as processes of "a drive controller". Steps S103, S104, and S108 function as processes of "an abnormality determiner", step S102 functions as a process of "a steering torque estimator", and step S109 functions as a process of "an abnormality notifier".

Steps S154, S156, S157, S158 in FIG. 6 and steps S164, S166, S167, S168 in FIG. 7 function as processes of "a learning component".

(Second Embodiment

Figure 8:
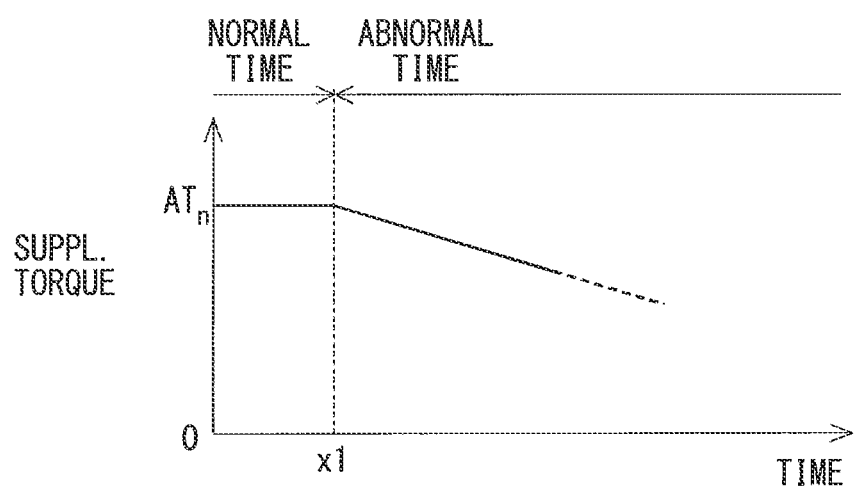
FIG. 8 is a graph of the drive control of the electric motor in a second embodiment of the present disclosure.

The second embodiment of the present disclosure is described based on FIG. 8.

Since the control of the motor 65 at the time of determining that the steering torque detection value $T_s$ is abnormal is different in the present embodiment, the description of the present embodiment centers around such difference.

As shown in FIG. 8, when it is determined that the steering torque detection value $T_s$ is abnormal in the present embodiment, the supplemental torque is decreased gradually. Even in such configuration, the driver can readily recognize the abnormalities in the steering controller 1, with the help of the warning by the lighting of the warning lamp 90.

In the present embodiment, the drive control part 77 decreases the supplemental torque gradually at the time of abnormalities. Thereby, even when the steering torque detection value $T_s$ is abnormal, the drive of the motor 65 may be continued and the driver's steering load is reduced. Further, due to a gradual increase of the required torque by which the steering operation of the steering wheel 10 is performed in comparison to the normal time, it is easy for the driver to recognize the abnormalities in the steering controller 1.

Further, the same effect as the above-mentioned embodiment is also achieved.

(Third Embodiment)

Figure 9:
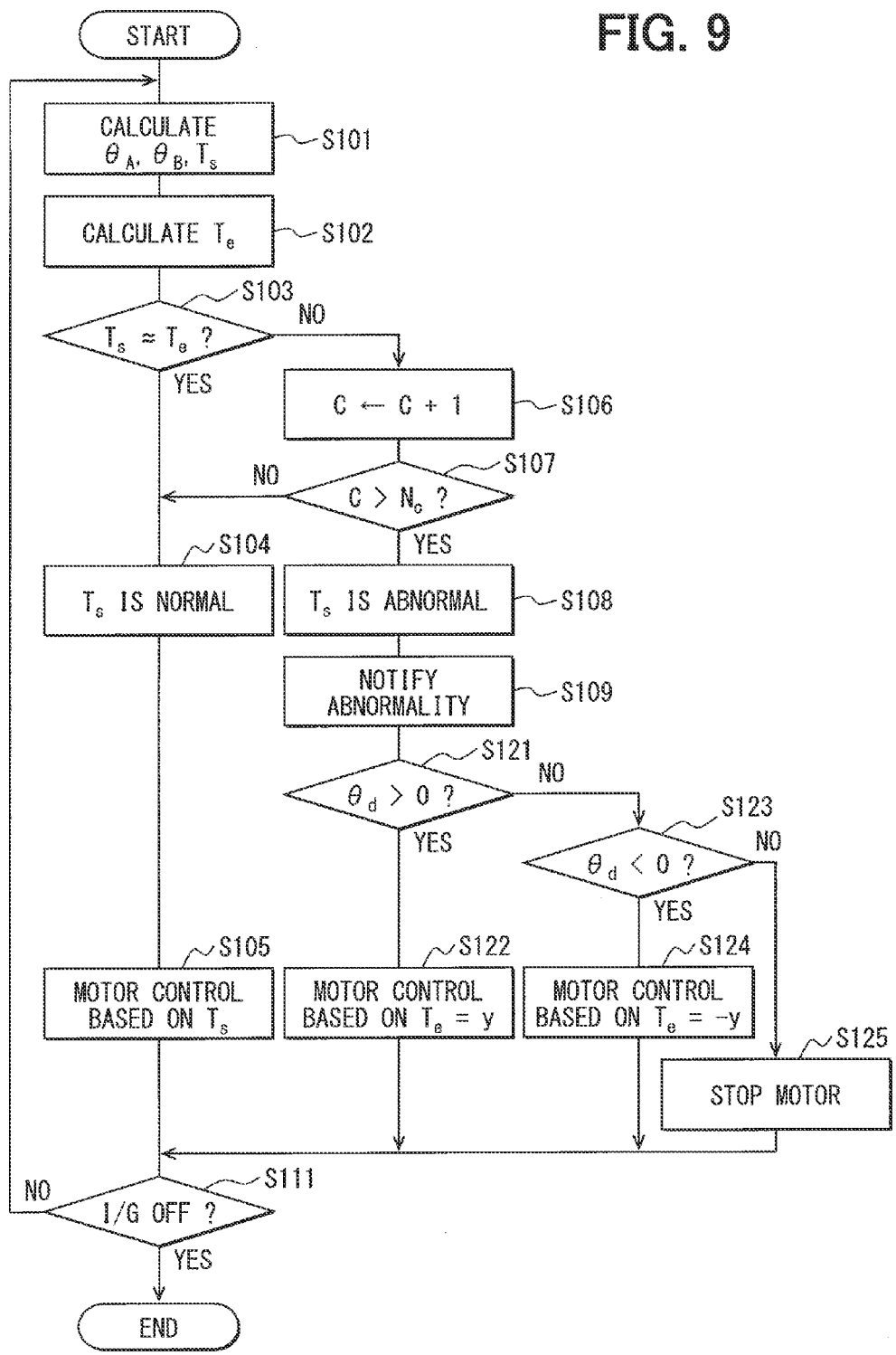
FIG. 9 is a flowchart of the abnormality determination process in a third embodiment of the present disclosure.

The third embodiment of the present disclosure is described based on FIG. 9.

Since, in a flowchart shown in FIG. 9, step S110 of FIG. 4 is replaced with steps S121-S125, the description of the present embodiment centers around such difference.

In step S121 which occurs after determining that the steering torque detection value $T_s$ is abnormal, it is determined whether the angle difference value $\theta_d$ is a positive value. When it is determined that the angle difference value $\theta_d$ is not a positive value (S121: NO), the process proceeds to step S123. When it is determined that the angle difference value $\theta_d$ is a positive value (S121: YES), the process proceeds to step S122.

In step S122, assuming that the steering torque estimation value $T_e$ is a predetermined value y, the process controls the drive of the motor 65 based on the steering torque estimation value $T_e$. Here, the value of y is a positive value.

In step S123, which occurs after it is determined that the angle difference value $\theta_d$ is not a positive value (S121: NO), it is determined whether the angle difference value $\theta_d$ is a negative value. When it is determined that the angle difference value $\theta_d$ is not a negative value (S123: NO), the process proceeds to step S125. When it is determined that the angle difference value $\theta_d$ is a negative value (S123: YES), the process proceeds to step S124.

In step S124, assuming that the steering torque estimation value $T_e$ is a predetermined value of –y (i.e., negative y), the process controls the drive of the motor 65 based on the steering torque estimation value $T_e$.

In step S125, the process stops the motor 65.

In the present embodiment, when the steering torque detection value $T_s$ is abnormal, in which direction the supplemental torque is provided is determined based on the angle difference value $\theta_d$, and the drive of the motor 65 is controlled so that the supplemental torque in a constant amount is provided according to the steering direction of the steering wheel 10.

Even in such configuration, assistance of the steering by the power-steering device 60 may be continued. Since the supplemental torque provided by the power-steering device 60 is different from the normal time, the driver can readily recognize the abnormalities in the steering controller 1, with the help of the warning by the lighting of the warning lamp 90.

In the present embodiment, when it is determined by the abnormality determination part 76 that the steering torque detection value $T_s$ is abnormal, by the drive control part 77 controls the drive of the motor 65 so that the predetermined torque according to the steering direction of the steering wheel 10 (i.e., a constant amount of the supplemental torque) is outputted as the supplemental torque. Thereby, even when the steering torque detection value $T_s$ is abnormal, the drive of the motor 65 may be continued and the driver's steering load is reduced. Since the required torque by which the steering operation of the steering wheel 10 is performed is different from the normal time, it is easy for the driver to recognize the abnormalities in the steering controller 1 even with a simple configuration described above.

Further, the same effect as the above-mentioned embodiment is also achieved.

In the present embodiment, steps S105, S122, S124, S125 are the processes that function as "a drive controller", and the rest is the same as the first embodiment.

(Fourth Embodiment)

Figure 10:
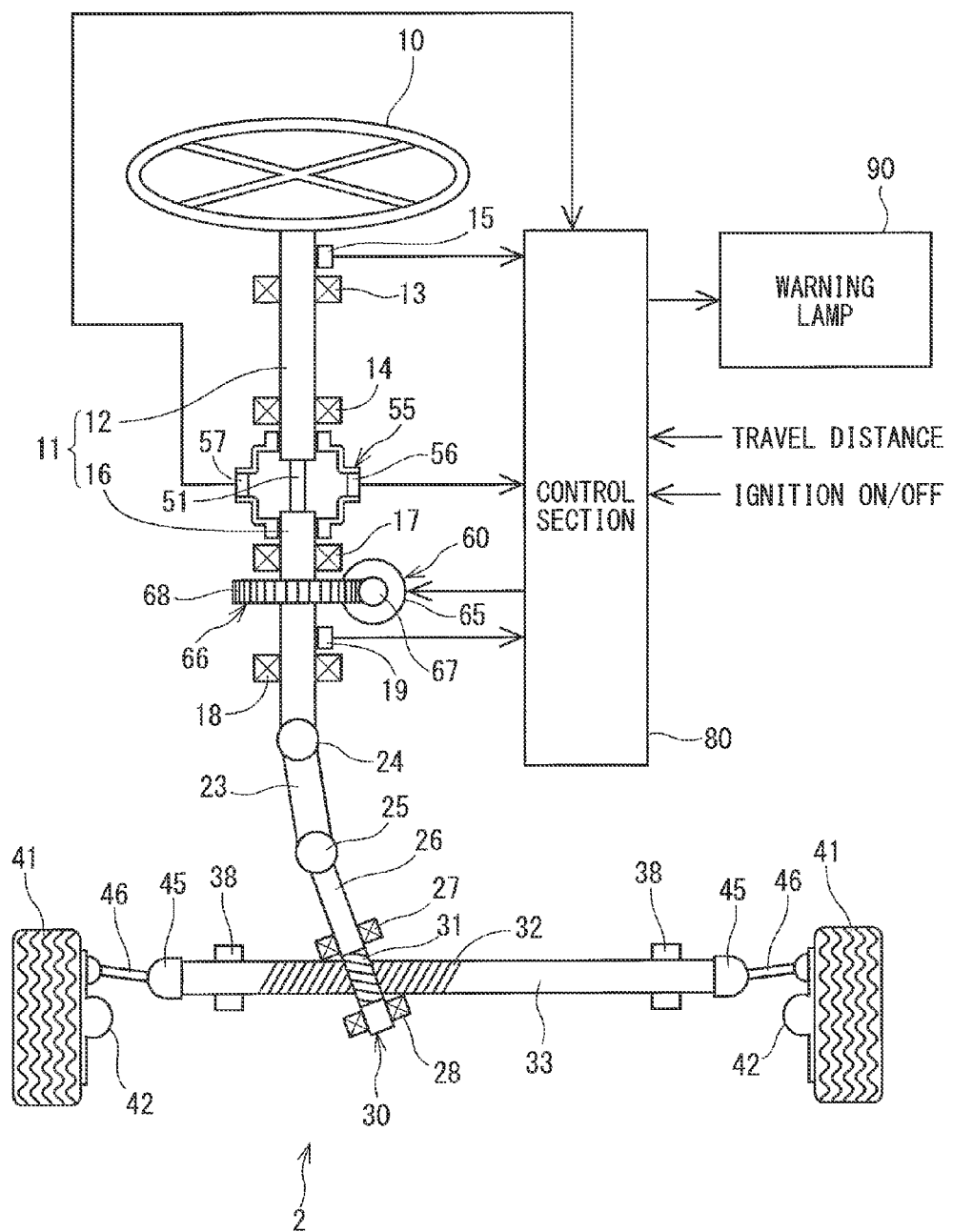
FIG. 10 is an illustration diagram of the steering controller in a fourth embodiment of the present disclosure.
Figure 11:
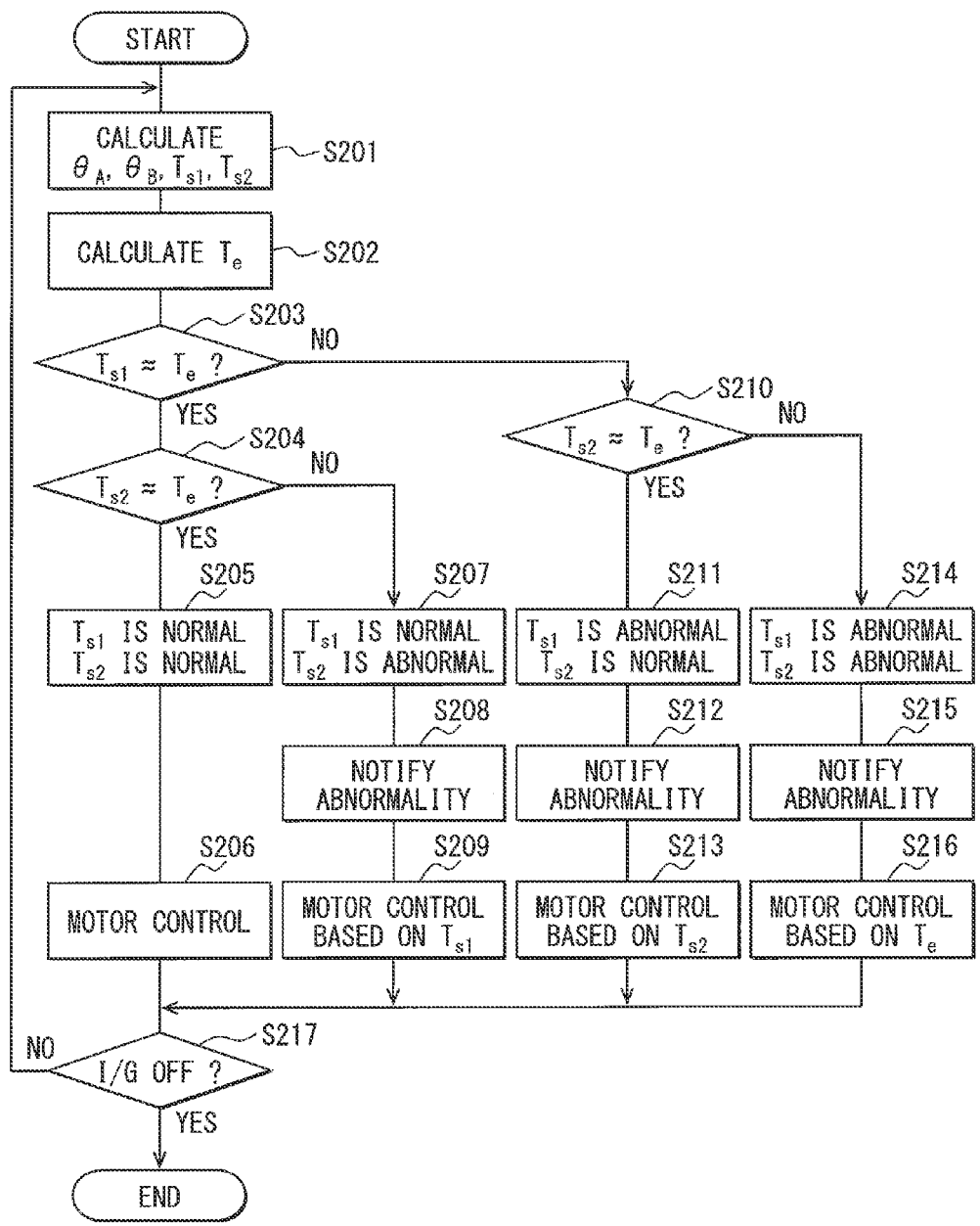
FIG. 11 is a flowchart of the abnormality detection process in the fourth embodiment of the present disclosure.

The steering controller in the fourth embodiment of the present disclosure is described based on FIGS. 10 and 11.

As shown in FIG. 10, a torque sensor 55 of a steering controller 2 in the present embodiment has two magnetic sensors 56 and 57. The magnetic sensor 56 detects the twist displacement of the torsion bar 51 according to the steering torque inputted to the steering wheel 10, and outputs it (i.e., the detected twist displacement) to the control section 70 as a third detection value K1. The magnetic sensor 57 detects the twist displacement of the torsion bar 51 according to the steering torque inputted to the steering wheel 10, and outputs it (i.e., the detected twist displacement) to the control section 70 as a third detection value K2.

In the present embodiment, the steering torque calculation part 73 calculates a first steering torque detection value $T_{s1}$ based on the third detection value K1 detected by the magnetic sensor 56, and also calculates a second steering torque detection value $T_{s2}$ based on the third detection value K2 detected by the magnetic sensor 57. Alternatively, the torque sensor 55 may calculate the first steering torque detection value $T_{s1}$ and the second steering torque detection value $T_{s2}$, and the steering torque calculation part 73 may obtain, as "the third detection value", the first steering torque detection value $T_{s1}$ and the second steering torque detection value $T_{s2}$ calculated in the above-described manner.

The abnormality determination part 76 determines the abnormalities of the first steering torque detection value $T_{s1}$ and the second steering torque detection value $T_{s2}$ based on the steer angle $\theta_A$ and the second shaft turning angle $\theta_B$. In the present embodiment, by comparing (i) the first steering torque detection value $T_{s1}$ or the second steering torque detection value $T_{s2}$ with (ii) the steering torque estimation value $T_e$ calculated based on the steer angle $\theta_A$ and the second shaft turning angle $\theta_B$, the abnormalities of the first steering torque detection value $T_{s1}$ and the second steering torque detection value $T_{s2}$ are detected.

When an absolute value of difference between the steering torque estimation value $T_e$ and the first steering torque detection value $T_{s1}$ is greater than a predetermined determination threshold, it is determined that the first steering torque detection value $T_{s1}$ is abnormal. Further, when an absolute value of difference between the steering torque estimation value $T_e$ and the second steering torque detection value $T_{s2}$ is greater than a predetermined determination threshold, it is determined that the second steering torque detection value $T_{s2}$ is abnormal.

When it is determined that the first steering torque detection value $T_{s1}$ is abnormal, the abnormality determination part 76 outputs a first abnormal signal $S_{e1}$ to the drive control part 77 and the notification part 78. When it is determined that the second steering torque detection value $T_{s2}$ is abnormal, the abnormality determination part 76 outputs the second abnormal signal $S_{e2}$ to the drive control part 77 and the notification part 78.

The drive control part 77 controls the drive of the motor 65 based on the first steering torque detection value $T_{s1}$, the second steering torque detection value $T_{s2}$, or the steering torque estimation value $T_e$.

Here, an abnormality determination process in the present embodiment is described based on a flowchart in FIG. 11.

In step S201, the steer angle calculation part 71 obtains the first detection value A, and calculates the steer angle $\theta_A$. Further, the second shaft turning angle calculation part 72 obtains the second detection value B, and calculates the second shaft turning angle $\theta_B$. Then, the steering torque calculation part 73 obtains the two third detection values K1 and K2, and calculates the first steering torque detection value $T_{s1}$ and the second steering torque detection value $T_{s2}$.

The process of step S202 is the same as the process of step S102 in FIG. 4.

In step S203, it is determined whether the first steering torque detection value $T_{s1}$ and the steering torque estimation value $T_e$ match with each other by the abnormality determination part 76. More specifically, when the absolute value of difference between the first steering torque detection value $T_{s1}$ and the steering torque estimation value $T_e$ is equal to or less than a predetermined determination threshold, it is determined that the first steering torque detection value $T_{s1}$ and the steering torque estimation value $T_e$ match with each other. When it is determined that the first steering torque detection value $T_{s1}$ and the steering torque estimation value $T_e$ do not match with each other (i.e., when the absolute value of difference between the first steering torque detection value $T_{s1}$ and the steering torque estimation value $T_e$ is greater than the predetermined determination threshold) (S203: NO), the process proceeds to step S210. When it is determined that the first steering torque detection value $T_{s1}$ and the steering torque estimation value $T_e$ match with each other (i.e., when the absolute value of difference between the first steering torque detection value $T_{s1}$ and the steering torque estimation value $T_e$ is equal to or less than the predetermined determination threshold) (S203: YES), the process proceeds to step S204.

In step S204, it is determined whether the second steering torque detection value $T_{s2}$ and the steering torque estimation value $T_e$ match with each other by the abnormality determination part 76. More specifically, when the absolute value of difference between the second steering torque detection value $T_{s2}$ and the steering torque estimation value $T_e$ is equal to or less than a predetermined determination threshold, it is determined that the second steering torque detection value $T_{s2}$ and the steering torque estimation value $T_e$ match with each other. When it is determined that the second steering torque detection value $T_{s2}$ and the steering torque estimation value $T_e$ do not match with each other (i.e., when the absolute value of difference between the second steering torque detection value $T_{s2}$ and the steering torque estimation value $T_e$ is greater than the predetermined determination threshold) (S204: NO), the process proceeds to step S207. When it is determined that the second steering torque detection value $T_{s2}$ and the steering torque estimation value $T_e$ match with each other (i.e., when the absolute value of difference between the second steering torque detection value $T_{s2}$ and the steering torque estimation value $T_e$ is equal to or less than the predetermined determination threshold) (S204: YES), the process proceeds to step S205.

The determination threshold in step S203 and the determination threshold in step S204 may be the same value, or may be different values.

In step S205 which occurs after the determination that both of the first steering torque detection value $T_{s1}$ and the second steering torque detection value $T_{s2}$ match the steering torque estimation value $T_e$ (S203: YES and S204: YES), it is determined that the first steering torque detection value $T_{s1}$ and the second steering torque detection value $T_{s2}$ are both normal.

In step S206, based at least on one of the first steering torque detection value $T_{s1}$ and the second steering torque detection value $T_{s2}$, the drive control part 77 controls the drive of the motor 65. For example, in case that the first steering torque detection value $T_{s1}$ is used for control and the second steering torque detection value $T_{s2}$ is used for monitoring, the drive of the motor 65 is controlled based on the first steering torque detection value $T_{s1}$. Further, the drive of the motor 65 may also be controlled based on an average value, i.e., by using an average of the first steering torque detection value $T_{s1}$ and the second steering torque detection value $T_{s2}$.

In step S207 which occurs after the determination that the first steering torque detection value $T_{s1}$ matches the steering torque estimation value $T_e$ and the second steering torque detection value $T_{s2}$ does not match the steering torque estimation value $T_e$ (S203: YES and S204: NO), the abnormality determination part 76 determines that the first steering torque detection value $T_{s1}$ is normal and the second steering torque detection value $T_{s2}$ is abnormal, and outputs the second abnormal signal $S_{e2}$ to the drive control part 77 and the notification part 78.

The process of step S208 is the same process of S109 in FIG. 4.

In step S209, the drive control part 77 controls the drive of the motor 65 based on the "determined-as-normal" first steering torque detection value $T_{s1}$, which has been determined as normal.

In step S210 which occurs after the determined that the first steering torque detection value $T_{s1}$ does not match the steering torque estimation value $T_e$ (S203: YES), it is determined by the abnormality determination part 76 whether the second steering torque detection value $T_{s2}$ matches the steering torque estimation value $T_e$. The process here is the same as that of step S204. When it is determined that the second steering torque detection value $T_{s2}$ and the steering torque estimation value $T_e$ match with each other (S210: YES), the process proceeds to step S211. When it is determined that the second steering torque detection value $T_{s2}$ and the steering torque estimation value $T_e$ do not match with each other (S210: NO), the process proceeds to step S214.

In step S211 which occurs after the determination that the first steering torque detection value $T_{s1}$ does not match the steering torque estimation value $T_e$ and the second steering torque detection value $T_{s2}$ matches the steering torque estimation value $T_e$ (S203: NO and S210: YES), the abnormality determination part 76 determines that the first steering torque detection value $T_{s1}$ is abnormal and the second steering torque detection value $T_{s2}$ is normal, and outputs the first abnormal signal $S_{e1}$ to the drive control part 77 and the notification part 78.

The process of step S212 is the same process of step S208.

In step S213, the drive control part 77 controls the drive of the motor 65 based on the normal second steering torque detection value $T_{s2}$.

In step S214 which occurs after the determination that both of the first steering torque detection value $T_{s1}$ and the second steering torque detection value $T_{s2}$ does not match the steering torque estimation value $T_e$ (S203: NO and S210: NO), the abnormality determination part 76 determines that both of the first steering torque detection value $T_{s1}$ and the second steering torque detection value $T_{s2}$ are abnormal, and outputs the first abnormal signal $S_{e1}$ and the second abnormal signal $S_{e2}$ to the drive control part 77 and the notification part 78.

The process of step S215 is the same process of step S208.

In step S216, the drive control part 77 controls the drive of the motor 65 based on the steering torque estimation value $T_e$.

The process of step S217 is the same as the process of S111 in FIG. 4. That is, when the ignition switch is not turned off (S217: NO), the process returns to step S201, and when the ignition switch is turned off (S217: YES), the process finished itself.

Further, even though an explanation is omitted in FIG. 11, similarly to the first embodiment, the abnormality determination may be performed prior to the process in step S207, S211, and S214, by adding the process of steps S106 and S107 in FIG. 4, i.e., by examining whether the count value C of the delay counter exceeds a predetermined number of times Nc, and excess of which being determined as abnormal.

Further, when it is determined that the first steering torque detection value $T_{s1}$ is abnormal, the control of the motor 65 in step S213 may be performed based on the steering torque estimation value $T_e$, which is the same as step S216. Similarly, when it is determined that the second steering torque detection value $T_{s2}$ is abnormal, the control of the motor 65 (in step S209) may be performed based on the steering torque estimation value $T_e$, which is the same as step S216.

The control method of the motor 65 in steps S209, S213, and S216 may be any method explained in one of the first embodiment to the third embodiment.

Further, when it is determined that both of the first steering torque detection value $T_{s1}$ and the second steering torque detection value $T_{s2}$ are abnormal, the drive of the motor 65 may be stopped in step S216, and the assistance of steering by the power-steering device 60 may be stopped.

According to the present embodiment, the steering torque calculation part 73 calculates the plural steering torque detection values $T_{s1}$ and $T_{s2}$ based on the two third detection values K1 and K2. The abnormality determination part 76 determines abnormalities at least in one of the steering torque detection values $T_{s1}$ and $T_{s2}$ based on the steer angle $\theta_A$ and the second shaft turning angle $\theta_B$.

For example, in one configuration that uses two magnetic sensors 56 and 57 in the torque sensor 55 for calculating the two steering torque detection values $T_{s1}$ and $T_{s2}$, having an abnormality in at least one of the two steering torque detection values $T_{s1}$ and $T_{s2}$ is detectable based on the comparison between the two values $T_{s1}$ and $T_{s2}$.

On the other hand, by simply comparing the two steering torque detection values $T_{s1}$ and $T_{s2}$, it is not possible to detect/recognize that either one of the two values $T_{s1}$ and $T_{s2}$ has an abnormality.

Therefore, in the present embodiment, by comparing (i) the steering torque estimation value $T_e$ that is calculated based on the steer angle $\theta_A$ and the second shaft turning angle $\theta_B$ with (ii) one of the first steering torque detection value $T_{s1}$ or/and the second steering torque detection value $T_{s2}$, the abnormalities of the first steering torque detection value $T_{s1}$ and the second steering torque detection value $T_{s2}$ are determined.

In such manner, which one of the first steering torque detection value $T_{s1}$ or the second steering torque detection value $T_{s2}$ has the abnormalities is appropriately determined.

Further, the drive control part 77 controls the drive of the motor 65 based on the normal steering torque detection values $T_{s1}$ and $T_{s2}$. That is, in the present embodiment, when either one of the first steering torque detection value $T_{s1}$ or the second steering torque detection value $T_{s2}$ is normal, based on a normal one of the first steering torque detection value $T_{s1}$ or the second steering torque detection value $T_{s2}$, the drive of the motor 65 is controlled. Thereby, based on the normal first steering torque detection value $T_{s1}$ or the normal second steering torque detection value $T_{s2}$, the drive of the motor 65 is appropriately continued and the driver's steering load is reduced. The same effects as the above-mentioned embodiments are also achieved.

According to the present embodiment, step S201 in FIG. 11 functions as the processes of "a first rotation angle calculator", "a second rotation angle calculator", and "a steering torque calculator", and steps S206, S209, S213, and S216 function as the process of "a drive controller". Further, steps S203-S205, S207, S210, S211, and S214 function as the process of "an abnormality determiner", and step S202 functions as the process of "a steering torque estimator", and steps S208, S212, and S215 function as the process of "an abnormality notifier".

In the fifth to seventh embodiments below, the calculation method of the second shaft turning angle $\theta_B$ is different from the preceding embodiments, and the explanation of the fifth to seventh embodiments centers around such difference.

(Fifth Embodiment)

Figure 12:
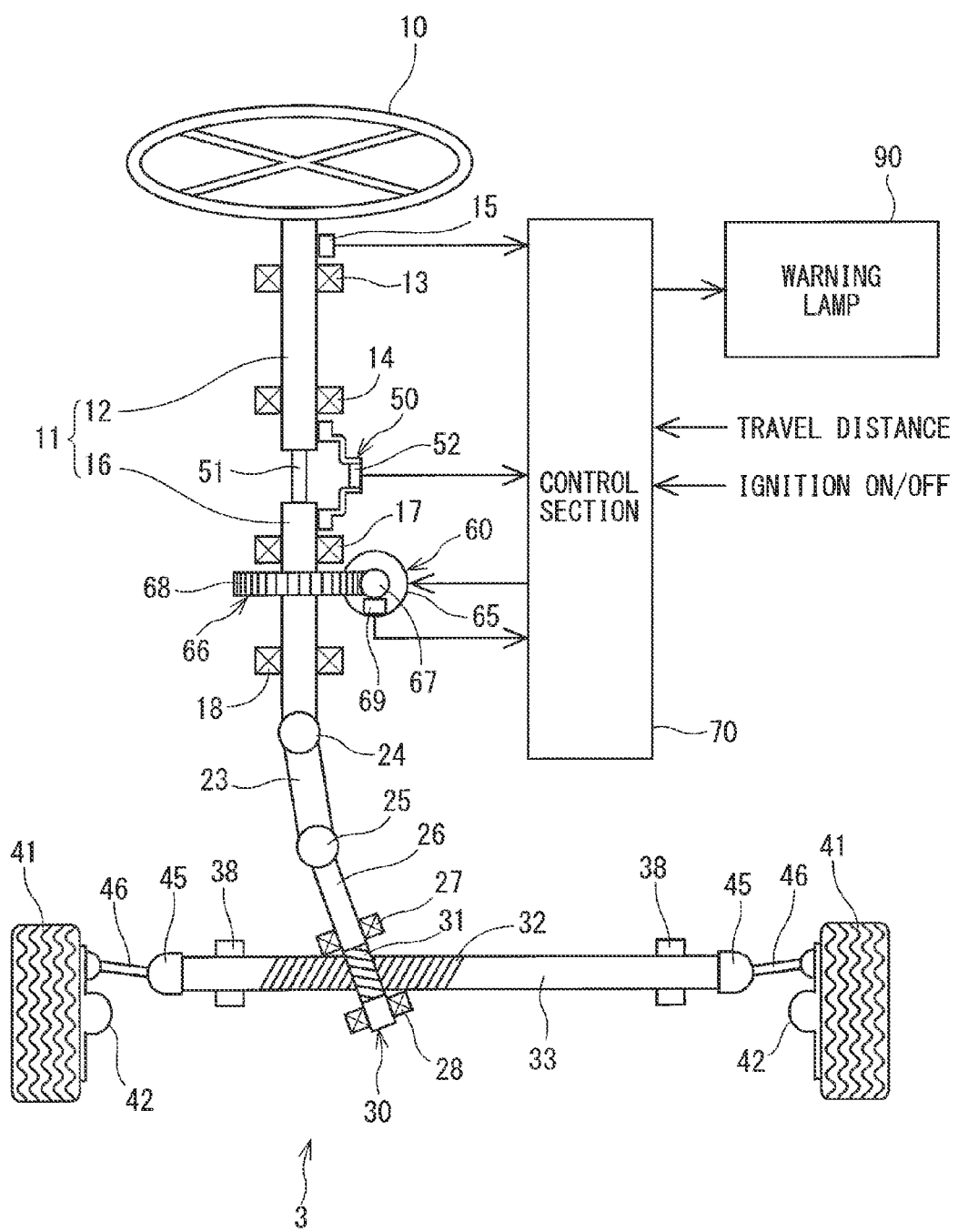
FIG. 12 is an illustration diagram of the steering controller in a fifth embodiment of the present disclosure.

The steering controller in the fifth embodiment of the present disclosure is shown in FIG. 12.

As shown in FIG. 12, in a steering controller 3, the second shaft rotation angle sensor 19 is not provided. Instead, a motor rotational angle $\theta_M$ is calculated based on a detection value M of a rotational angle sensor 69 of the motor 65 of the power-steering device 60, and the motor rotational angle $\theta_M$ is converted to the second shaft turning angle $\theta_B$. That is, in the present embodiment, the rotational angle sensor 69 corresponds to "a second detector" in the claims, and the detection value M of the rotational angle sensor 69 is equivalent to "a motor rotation angle detection value" in the claims. The motor rotational angle $\theta_M$ may also be considered as "a motor rotation angle detection value".

Here, the conversion of the second shaft turning angle $\theta_B$ based on the motor rotational angle $\theta_M$ is described.

When the number of teeth of the warm 67 is designated as G1 and the number of teeth of the worm wheel 68 is designated as G2, a speed reduction ratio i of the speed reducer 66 is represented by a following equation (13).

$$i = G2/G1 \qquad (13)$$

Further, since the motor rotational angle $\theta_M$ is equal to a turning angle $\theta_W$ of the warm 67, the second shaft turning angle $\theta_B$ is calculated by a following equation (14) based on the motor rotational angle $\theta_M$ and the speed reduction ratio i.

$$\theta_B = \theta_M \times i \quad (14)$$

When calculating the second shaft turning angle $\theta_B$ based on the motor rotational angle $\theta_M$, the conversion error $2\beta$ in a relationship between the angle difference value $\theta_d$ and the steering torque detection value $T_s$ may increase due to the backlash of the speed reducer 66. However, such an increase of the error may be compensated by learning the zero point correction value $\beta$ described in the first embodiment or the like.

According to the present embodiment, the rotational angle sensor 69 detects the detection value M concerning the motor rotational angle $\theta_M$, which is a turning angle of the motor 65 as the second detection value.

Since the second shaft turning angle $\theta_B$ is calculated by the second shaft turning angle calculation part 72 by using the motor rotational angle $\theta_M$ which is used for the drive control of the motor 65, the abnormalities of the torque sensor 50 is detected without separately providing the second shaft rotation angle sensor 19 for detecting a rotation of the second column shaft 16. Thereby, the configuration of the steering controller 1 can be more simplified. Further, the same effects as the above-mentioned embodiment are also achieved.

(Sixth Embodiment)

Figure 13:
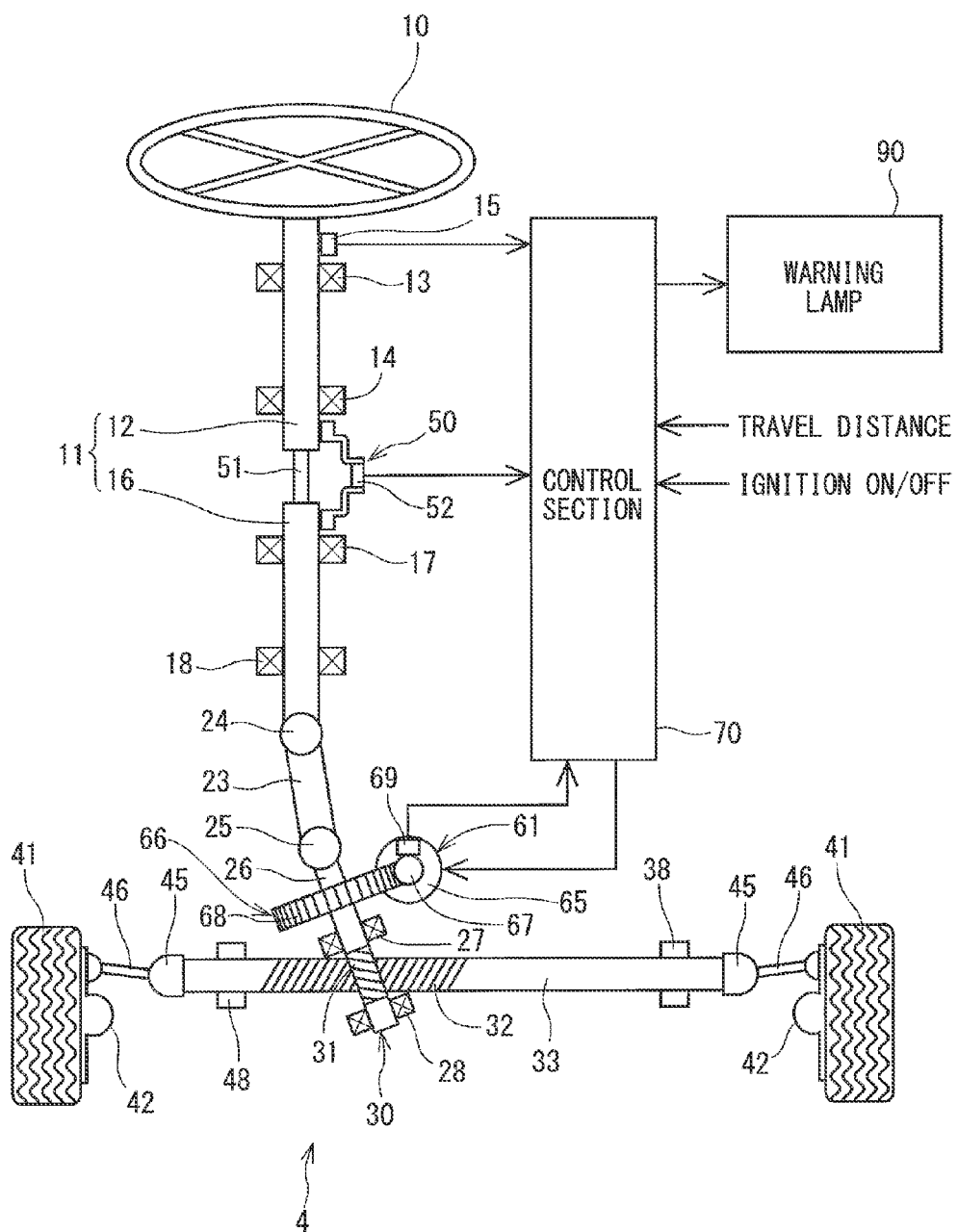
FIG. 13 is an illustration diagram of the steering controller in a sixth embodiment of the present disclosure.

The steering controller in the sixth embodiment of the present disclosure is shown in FIG. 13.

In a steering controller 4 of the present embodiment, a power-steering device 61 is disposed on the pinion shaft 26 makes a so-called "pinion assistance type" power steering. The second shaft turning angle $\theta_B$ is converted based on the motor rotational angle $\theta_M$, just like the fifth embodiment.

In the fifth embodiment, in a relationship between the angle difference value $\theta_d$ and the steering torque detection value $T_s$, the conversion error $2\beta$ may increase due to a gap space between adjustable joints 24 and 25 and the like, in comparison to the fifth embodiment. However, such an error may be compensated by learning the zero point correction value $\beta$, or the like.

In the configuration in the present embodiment, the same effects as the above-mentioned embodiments are also achieved.

(Seventh Embodiment)

Figure 14:
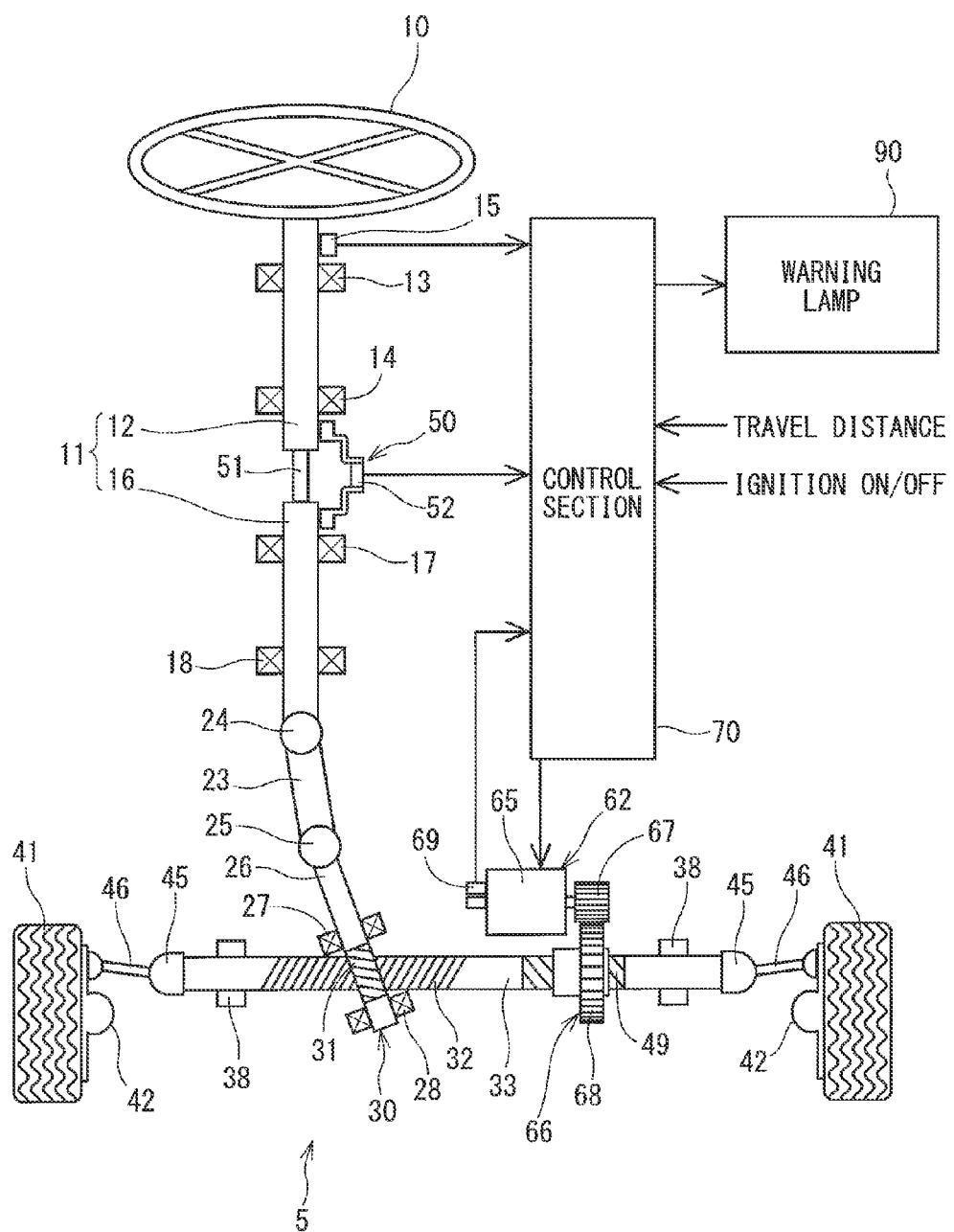
FIG. 14 is an illustration diagram of the steering controller in a seventh embodiment of the present disclosure.

The steering controller in the seventh embodiment of the present disclosure is shown in FIG. 14.

In a steering controller 5 of the present embodiment, a power-steering device 62 disposed on a rack bar 33 makes a so-called "rack assist type" power steering. According to the present embodiment, the worm wheel 68 of the speed reducer 66 is connected with the rack bar 33 via a ball screw 49. The second shaft turning angle $\theta_B$ of the present embodiment is calculated based on the motor rotational angle $\theta_M$, just like the fifth embodiment. In such case, a relationship between the second shaft turning angle $\theta_B$ and the motor rotational angle $\theta_M$ may be set up as a conversion value j, for example, and the second shaft turning angle $\theta_B$ is calculated based on such conversion value j and the motor rotational angle $\theta_M$.

Further, the conversion error $2\beta$ in a relationship between the angle difference value $\theta_d$ and the steering torque detection value $T_s$ may increase due to the backlash of the adjustable joints 24 and 25, the backlash of the steering gearbox 30, and the like, in comparison to the fifth embodiment. However, such an increase of the error may be compensated by learning the zero point conversion value $\beta$, or the like.

In such configuration, the same effects as the above-mentioned embodiments are also achieved.

(Eighth Embodiment)

Figure 15:
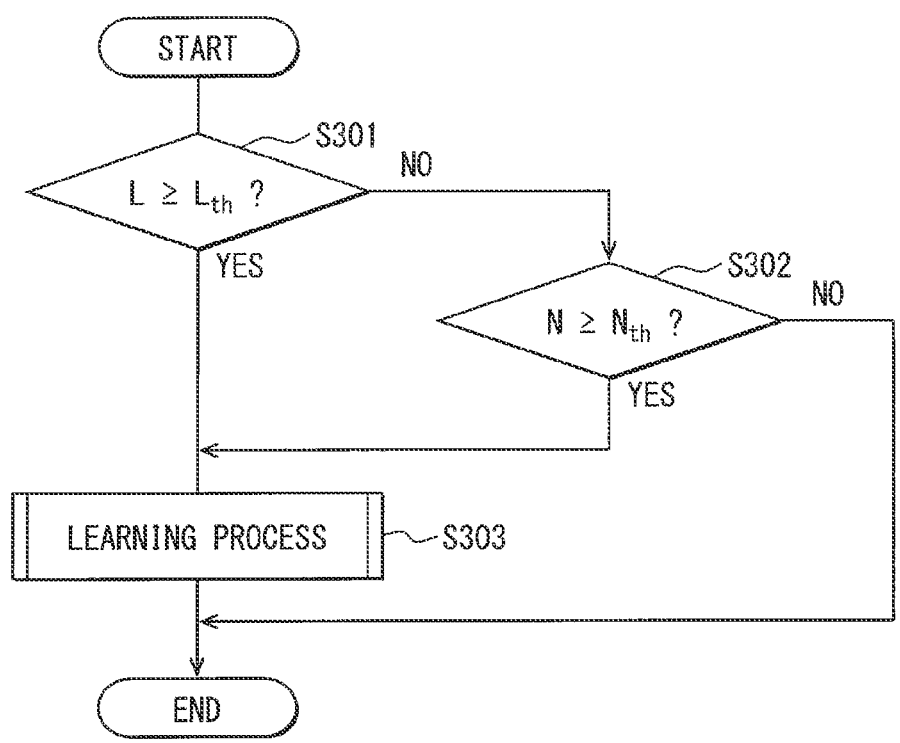
FIG. 15 is a flowchart of a learning execution determination process in an eighth embodiment of the present disclosure.

The eighth embodiment of the present disclosure is described based on FIG. 15. In the present embodiment, since an execution timing of the learning process is different from the preceding embodiments, the explanation of the present embodiment centers around such difference.

According to the above-mentioned embodiments, the learning process is always performed when/while the ignition switch is turned on. In the present embodiment, the learning process is performed when (i) a travel distance L after the previous learning is equal to or greater than a preset distance $L_{th}$, or (ii) the number of times N of ON and OFF of the ignition switch after the previous learning is equal to or greater than a preset number of times $N_{th}$.

A learning execution determination process is described based on a flowchart shown in FIG. 15. The (learning execution determination) process is performed at predetermined intervals by the learning part 79.

In step S301, it is determined whether the travel distance L after the previous learning is equal to or greater than the preset distance $L_{th}$. When the travel distance L after study is determined as being equal to or greater than the preset distance $L_{th}$ (S301: YES), the process proceeds to step S303, and, when the travel distance L is smaller than the preset distance $L_{th}$ (S301: NO), the process proceeds to step S302.

In step S302, it is determined whether the number of times N of ON and OFF of the ignition switch after the previous learning is equal to or greater than the preset number of times $N_{th}$. When it is determined that the number of times N of ON and OFF of the ignition switch after the previous learning is smaller than the preset number of times $N_{th}$ (S302: NO), the present process is finished without performing the learning process. When it is determined that the number of times N of ON and OFF of the ignition switch is equal to or greater than the preset number of times $N_{th}$ (S302: YES), the process proceeds to S303.

In step S303, the learning process as shown in FIG. 6 or 7 is performed, for example. In such case, the learning process is finished (i) after a preset period of time from the start of the learning process, or (ii) after a preset number of calculations of the conversion coefficient $\alpha$ and the zero point correction value $\beta$.

Further, whether to perform the learning process may be determined based on only one of step S301 or step S302. Further, the learning execution determination process may be performed for each of the conversion coefficient $\alpha$ and the zero point correction value $\beta$. In such case, the preset distance $L_{th}$ which is a threshold of the travel distance L concerning the learning execution determination and the preset number of times $N_{th}$ which is a threshold of the number of times N of ON and OFF of the ignition switch are defined as different values, and the learning of the conversion coefficient $\alpha$ and the learning of the zero point correction value $\beta$ may be performed at different frequencies.

According to the present embodiment, the learning part 79 "re-learns" at least one of the conversion coefficient $\alpha$ and the zero point correction value $\beta$ when the travel distance L after the previous learning is equal to or greater than the preset distance $L_{th}$, or when the number of times N of turning ON and OFF of the ignition switch after the previous learning is equal to or greater than the preset number of times $N_{th}$.

Therefore, according to wear of the machine structures such as a speed reducer or the like and/or according to the change caused by the aging deterioration, the steering torque estimation value $T_e$ is calculated more appropriately. Further, the calculation load is reduced as compared with a case in which the conversion coefficient α and the zero point correction value β are always/continuously calculated.

Further, the same effects as the above-mentioned embodiments are also achieved.

(Other Embodiments)

(a) The control section (70) embodied in the above as one unit may also be provided as plural units of devices. For example, the steer angle calculation part (71) may be included in a brake controller which performs a brake control, and the calculated steer angle may be obtained by the control section of the steering controller.

(b) The first detector embodied in the above as a steer angle sensor disposed on the first column shaft may also be provided as a sensor on other parts, as long as the sensor can detect the first detection value concerning the turning angle of the first shaft. Further, the first detection value may be, as long as being usable for the calculation of the turning angle of the first shaft, any value.

Further, the second detector embodied in the above as the second shaft turning angle sensor disposed on the second column shaft or the rotational angle sensor which detects the turning angle of the electric motor may also be provided as a sensor on other parts, as long as the sensor can detect the second detection value concerning the turning angle of the second shaft. Further, the second detection value may be, as long as being usable for the calculation of the turning angle of the second shaft, any value. For example, a stroke detector which detects the movement among along a longitudinal direction (e.g., a right/left direction in FIG. 1) of the rack bar may be provided as the second detector, and the movement amount along the longitudinal direction of the rack bar may be used as the second detection value. When the movement amount along the longitudinal direction of the rack bar and the turning angle of the second shaft are associated beforehand, the movement amount along the longitudinal direction of the rack bar is convertible to the turning angle of the second shaft.

(c) The torque detector disposed on the column shaft in the above may also be provided as a detector disposed on other parts, as long as being capable of detecting the steering torque inputted to the steering member. For example, in a rack assist type steering controller of the seventh embodiment, the torque detector may be provided on the pinion shaft. In such case, the pinion shaft on one side close to the steering member relative to the column shaft, the intermediate shaft, and the torque detector is considered as "a first shaft", and the pinion shaft on the other side close to the steerable wheel relative to the torque detector is considered as "a second shaft".

(d) The torque detector embodied in the above as a torque sensor of non-contact type which detects the twist displacement of the torsion bar with a magnetic sensor may also be provided as a sensor of other type, e.g., as a contact type torque sensor, as long as being capable of detecting the torque that is inputted to the steering member.

(e) The steering torque calculation part, which calculates, in the fourth embodiment, the first steering torque detection value and the second steering torque detection value based on the third detection value from each of the two magnetic sensors, may also be provided as the calculation part having only one magnetic sensor, for calculating plural steering torque detection values based on two third detection values from the only one magnetic sensor.

(f) According to the above-described fourth embodiment, the two third detection values are obtained, and the first steering torque detection value and the second steering torque detection value are calculated. Further, based on the first turning angle and the second turning angle, the abnormalities of the first steering torque detection value and the second steering torque detection value are determined. More specifically, the abnormalities of the first steering torque detection value and the second steering torque detection value are determined by comparing (i) the steering torque estimation value based on the difference between the first turning angle and the second turning angle with (ii) the first steering torque detection value or the second steering torque detection value.

In other embodiments, based on the comparison result of the first steering torque detection value and the second steering torque detection value, the abnormalities of at least one of the first steering torque detection value and the second steering torque detection value may be determined. In other words, based on the comparison result of plural steering torque detection values, at least one abnormality in the plural steering torque detection values may be determined. For example, when the absolute value of difference between the first steering torque detection value and the second steering torque detection value is greater than the predetermined determination threshold, it is determined that abnormalities exists in the first steering torque detection value or the second steering torque detection value.

In such case, which one of the two detection values, i.e., the first steering torque detection value or the second steering torque detection value, is abnormal is not determinable. Therefore, when abnormality is detected, which one of the two detection values is abnormal may be determined by comparing (i) the first steering torque detection value or the second steering torque detection value with (ii) the steering torque estimation value. Further, in case of having the abnormality in one of the first or second steering torque detection values, without identifying which one of the two detection values is abnormal, the drive of the electric motor may be performed based on the steering torque estimation value.

Further, in other embodiments, three or more steering torque detection values may be calculated.

(g) The steering torque estimation value calculated in the above by using the conversion equations (1)-(3) based on the angle difference value may also be calculated by a map calculation based on the angle difference value. Further, by omitting the learning part, the steering torque estimation value may be calculated based on a predetermined calculation equation or a predetermined map.

(h) The abnormalities in the steering controller notified to the driver by lighting the warning lamp in the above may also be notified through voice/sound from a speaker or the like, or may also be notified by a combination of the warning lamp and the voice/sound in other embodiments. Further, the notification part may be omitted, and the supplemental torque at the abnormal time may be provided in a different amount or in different manner for notifying the abnormalities to the driver.

(i) The speed reducer in the power-steering device in the above may be omitted from the power-steering device in other embodiments.

(j) The electric motor embodied as a three-phase brushless motor in the above may also be provided as other type motor, other than the three-phase brushless motor.

Such changes, modifications, and summarized schemes are to be understood as being within the scope of the present disclosure as defined by appended claims.

What is claimed is:

1. A steering controller comprising:
a first shaft connected to a steering member, the steering member being configured to receive a steering torque which is inputted to the steering member by a driver;
a second shaft connected to the first shaft and that transmits the steering torque to a steerable wheel;
a first detector configured to detect a turning angle of the first shaft, the turning angle of the first shaft being defined as a first detection value;
a second detector configured to detect a turning angle of the second shaft, the turning angle of the second shaft being defined as a second detection value;
a torque detector disposed between the first shaft and the second shaft and configured to detect the steering torque, the steering torque being defined as a third detection value;
a power-steering device disposed on a side of the torque detector that is closer to the steerable wheel than the steering member and having an electric motor configured to output a supplemental torque that assists a steering of the steering member by the driver; and
a control section including
a first rotation angle calculator configured to calculate a first turning angle that is a turning angle of the first shaft based on the first detection value,
a second rotation angle calculator configured to calculate a second turning angle that is a turning angle of the second shaft based on the second detection value,
a steering torque calculator configured to calculate a steering torque detection value based on the third detection value,
a drive controller configured to control a drive of the electric motor based on the steering torque detection value,
a steering torque estimator that is configured to calculate a steering torque estimation value based on the first turning angle and the second turning angle, and
an abnormality determiner configured to determine abnormalities of the steering torque detection value based on the first turning angle and the second turning angle, and
by comparing the steering torque estimation value with the steering torque detection value, wherein
when the abnormality determiner determines that abnormalities exit in the steering torque detection value, the drive controller is configured to control the drive of the electric motor based on the steering torque estimation value instead of the steering torque detection value, and
the control section has a learning component configured to learn at least one of a conversion coefficient used for a calculation of the steering torque estimation value based on the first turning angle and the second turning angle or a zero point correction value based on the first turning angle and the second turning angle.

2. The steering controller of claim 1, wherein
when a travel distance after a previous learning by the learning component is equal to or greater than a preset distance, or when a number of times of turning ON and OFF of an ignition switch after the previous learning is more than a preset number of times, the learning component is configured to re-learn at least one of the conversion coefficient or the zero point correction value.

3. The steering controller of claim 1, wherein
the second detector is configured to detect an electric motor rotation angle detection value concerning a turning angle of the electric motor as the second detection value.

4. The steering controller of claim 1, wherein
the steering torque calculator is configured to calculate plural steering torque detection values based on two third detection values, and based on (i) a comparison result of the plural steering torque detection values or (ii) on the first turning angle and the second turning angle, and
the abnormality determiner is configured to determine the abnormality in at least one of the plural steering torque detection values.

5. The steering controller of claim 4, wherein
the drive controller is configured to control the drive of the electric motor based on the normal steering torque detection value.

6. The steering controller of claim 1, wherein
when the abnormality determiner determines that abnormalities exist in the steering torque detection value, the drive controller is configured to control the drive of the electric motor so that the supplemental torque is outputted as an abnormal-time supplemental torque that is equal to or less than a normal-time supplemental torque which is a supplemental torque at a time when the steering torque detection value is normal.

7. The steering controller of claim 6, wherein
the abnormal-time supplemental torque has a value which is calculated as a product of the normal-time supplemental torque and a predetermined coefficient that is equal to or less than 1.

8. The steering controller of claim 6, wherein
the drive controller is configured to gradually decrease the supplemental torque at a time of having abnormalities.

9. The steering controller of claim 1, wherein
when the abnormality determiner determines that abnormalities exist in the steering torque detection value, the drive controller is configured to control the drive of the electric motor so that the supplemental torque is outputted as a predetermined torque according to a steering direction of the steering member.

10. The steering controller of claim 1, further comprising:
an abnormality notifier, in the control section, that is configured to notify the driver of abnormalities in the steering torque detection value when the abnormality determiner determines that the abnormalities exist in the steering torque detection value.

11. The steering controller of claim 1, wherein
the second detector is configured to directly detect the turning angle of the second shaft.

12. The steering controller of claim 1, wherein
the learning component is based on a difference between the first turning angle and the second turning angle, and based on the steering torque detection value.

* * * * *